US007035299B2

(12) United States Patent
Hori et al.

(10) Patent No.: US 7,035,299 B2
(45) Date of Patent: Apr. 25, 2006

(54) IMAGE FORMING APPARATUS

(75) Inventors: Hisamitsu Hori, Kanagawa (JP);
Sumihiro Nishihata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 105 days.

(21) Appl. No.: 10/095,011

(22) Filed: Mar. 12, 2002

(65) Prior Publication Data
US 2002/0163702 A1    Nov. 7, 2002

(30) Foreign Application Priority Data
Mar. 29, 2001  (JP) .............................. 2001-097599
Mar. 29, 2001  (JP) .............................. 2001-097600
May 21, 2001   (JP) .............................. 2001-150929

(51) Int. Cl.
 *H01S 3/10* (2006.01)
(52) U.S. Cl. .......................... 372/26; 372/99; 372/101
(58) Field of Classification Search ................ 345/4, 345/7; 372/26, 99, 101; 347/244, 258; 359/204, 359/208
See application file for complete search history.

(56) References Cited
U.S. PATENT DOCUMENTS

| 4,855,761 | A | * | 8/1989  | Hiiro ........................... 347/259 |
| 4,861,983 | A | * | 8/1989  | Sasada et al. ................ 250/235 |
| 5,111,325 | A | * | 5/1992  | DeJager ....................... 359/206 |
| 5,684,618 | A | * | 11/1997 | Atsuumi ....................... 359/208 |
| 5,715,021 | A | * | 2/1998  | Gibeau et al. ............... 359/216 |
| 6,445,362 | B1 | * | 9/2002 | Tegreene ........................ 345/7 |
| 6,583,912 | B1 | * | 6/2003 | Van Lerberghe ............ 359/204 |

\* cited by examiner

*Primary Examiner*—Minsun Oh Harvey
*Assistant Examiner*—Delma R. Flores-Ruiz
(74) *Attorney, Agent, or Firm*—Sughrue Mion, PLLC

(57) ABSTRACT

A light beam scanning device includes a light source section, a deflector and a reflection type optical system. The light source section is provided with three laser light sources. These laser light sources utilizes different modulation systems depending on corresponding semiconductor lasers. That is, the red-light laser light source and the blue-light laser light source each utilize a direct modulation system and the green-light laser light source utilizes an external modulation system using an external modulator (AOD). Reflecting mirrors and, the deflector and an arcsine mirror, which form the reflection type optical system, are arranged sequentially along an optical path at the side of the light source section from which light is emitted. Accordingly, laser light emitted from the light source section is guided only by the reflection type optical system to a recording material. As a result, no correction for light beams of different wavelengths is required.

26 Claims, 15 Drawing Sheets

FIG. I

IMAGE FORMING APPARATUS

BACKGROUND OF THE INVENTION

1. Field of the Invention

The present invention relates to an image forming apparatus, and particularly to an image forming apparatus in which a light beam is modulated and a recording material such as photosensitive material is exposed by being scanned with the light beam. The present invention also relates to an image forming apparatus in which images are recorded by reciprocating scanning.

2. Description of the Related Art

In a digital laboratory system or the like for recording digital image data on photographic printing paper, an image exposure apparatus is provided in which scan-exposure is carried out by using a light source (for example, a laser device) which generates a light beam (laser beam). For example, a general image exposure apparatus for photographic printing paper includes a light source which generates light beams of red (R), green (G) and blue (B) to obtain a color image, and based on color image data, the light beam is modulated for each of the colors R, G and B.

While the light beams are each deflected by a deflector such as a polygon mirror in a main scanning direction and photographic printing paper is being conveyed in a sub-scanning (slow scanning) direction, the photographic printing paper is exposed by scanning via a scanning optical system including a transmission type optical system such as an fθ lens or a cylindrical lens, thereby allowing a color image to be recorded thereon. Further, in this image exposure apparatus, light beams of R, G and B are modulated by using a large-size and expensive acousto-optic modulator (AOM) or the like to form an image. That is, the scanning optical system was designed or light beams were modulated so that a plurality of light beams have equal characteristics on the photographic printing paper.

However, when an equal rotational angle-type deflector such as a polygon mirror is used, the polygon mirror which is a rotator becomes large and the deflector itself needed to be made larger. Further, the light beams of R, G and B must be transmitted through a transmission type optical system, characteristics relating to color such as chromatic aberration must be constantly taken into consideration in the design for a lens. Moreover, it is necessary to built-in an external modulator for modulating light beams of R, G and B. Therefore, in order to obtain an image of good image quality, the image exposure apparatus needed to be made larger and a complicated structure thereof was required.

Also, for example, in an image recording apparatus, there are many cases in which laser light is caused to scan only in one direction by using a polygon mirror to compensate an optical face tangle error correction or the like, and thereafter, a recording material is moved in a sub-scanning direction while a main scanning line is being generated by the laser light.

In scanning light in a reciprocating manner by means of a reciprocating deflector such as a galvanometer scanner, when a recording material is moved in the sub-scanning direction at a fixed speed, directions to which the main-scanning lines are inclined differ from one another depending on a scanning direction. Therefore, it is difficult to generate main scanning lines in parallel.

Specifically, when laser light having an amplitude W is caused to scan in a reciprocating manner in the main scanning direction U so that an image is recorded in the range of a recording width B (see FIG. 13), the recording material is moved in the sub-scanning direction at a fixed speed. As a result, the main scanning line R obtained by scanning in a direction toward the right side in FIG. 13 and the main scanning line L obtained by scanning in a direction toward the left side are not made parallel to each other with an angle θ formed therebetween, thereby resulting in no formation of a favorable image.

If the spacing between main scanning lines is less than 400 dpi, the aforementioned problem becomes conspicuous. Even if the spacing is greater than 400 dpi, when a photosensitive material is used as the recording material, density unevenness is apt to become conspicuous depending on properties of photosensitive material or the size of spot light.

Accordingly, even when an image recording apparatus having an optical system which allows reciprocating scanning, such as a galvanometer scanner, is used, the main scanning line R or main scanning line L is generated by one-way scanning so as to realize recording of a high-quality image in the existing circumstances.

SUMMARY OF THE INVENTION

In view of the aforementioned circumstances, it is an object of the present invention to provide an image forming apparatus which can be formed by a small-size and simple structure. Further, it is another object of the present invention to provide an image forming apparatus in which an image of good quality can be obtained by reciprocating scanning.

A first aspect of the present invention is an image forming apparatus comprising: laser light sources which emit a plurality of light beams having different wavelengths; a reshaping section for reshaping each of the plurality of light beams; a deflector provided with a reflecting mirror which reflects incident light beam, the deflector deflecting the light beam by rotating the reflecting mirror around a previously set axis in a predetermined direction; a reflection type optical system having at least one reflecting surface which reflects the deflected light beam and guiding the light beam reflected by the reflecting surface to an image forming medium; and a control section which, based on image data, supplies a control signal for modulating the plurality of light beams to the laser light sources.

A second aspect of the present invention is an image forming apparatus according to the first aspect, wherein the laser light sources are provided so as to emit at least three light beams corresponding to color hues of cyan, magenta and yellow.

A third aspect of the present invention is an image forming apparatus according to the first or the second aspect, wherein a rotation of the reflecting mirror in the predetermined direction in the deflector is such that the reflecting mirror is repeatedly rotated alternately in an one direction and an opposite direction.

A fourth aspect of the present invention is an image forming apparatus according to any one of the first through the third aspect, wherein at least one of the reflecting surfaces is formed so as to have arcsine characteristics as a property of reflecting the incident light beam.

A fifth aspect of the present invention is an image forming apparatus according to any one of the first through the fourth aspects, wherein, in the reflection type optical system, an expansion coefficient of at least part of members which constitute the reflecting surfaces is made substantially equal to that of a housing body of the image forming apparatus.

A sixth aspect of the present invention is an image forming apparatus according to any one of the first through the fifth aspects, wherein modulation systems corresponding to respective laser light sources are applied to the control section includes.

A seventh aspect of the present invention is an image forming apparatus according to any one of the first through the sixth aspects, wherein the reshaping section is structured in such a manner that an optical axis of the light beam and a center optical axis of the reshaping section are made to cross each other.

An eighth aspect of the present invention is an image forming apparatus having a deflector in which reciprocating scanning of reflected light is carried out in a two-dimensional manner by rotating a mirror surface around two axes, said deflector comprising: a micro scanner having a reflecting mirror which is capable of rotating around a first axis and a second axis which are perpendicular to each other; and a position correcting section for moving a position in a subscanning direction of the reflected light in the subscanning direction by rotating the reflecting mirror around the second axis in accordance with conveyance of a recording medium in the subscanning direction while the reflected light is reciprocately scanned on the recording medium in a mainscan direction by oscillating the reflecting mirror around the first axis.

A ninth aspect of the present invention is an image forming apparatus according to the eighth aspect, wherein when the reflecting mirror is rotated around the second axis, correction is carried out so that main scanning lines generated on the recording medium are substantially at uniform intervals.

A tenth aspect of the present invention is an image forming apparatus according to any one of the eighth or the ninth aspect, wherein when the reflecting mirror is rotated around the second axis, bow characteristic of the main scanning lines on the recording medium is corrected.

An eleventh aspect of the present invention is an image forming apparatus according to any one of the eighth through the tenth aspects, wherein, on the recording medium, a partial region of a spot light of the reflected light on one main scanning line is made to overlap, in the sub-scanning direction, with a partial region of a spot light of the reflected light on another main scanning line which is adjacent to the one main scanning line.

A twelfth aspect of the present invention is an image forming apparatus according to any one of the eighth through the eleventh aspects, wherein one of an intensity and an emission time of a spot light is adjusted for recording on the recording medium in accordance with the conveyance of the recording medium in the sub-scanning direction.

Another aspect of the present invention is an image forming apparatus in which a plurality of light beams having different wavelengths emitted from laser light sources are modulated on the basis of image data to record an image, comprising: a deflector provided with a reflecting mirror which reflects an incident light beam, the deflector deflecting the light beam by rotating the reflecting mirror around an axis provided on the reflecting mirror in a predetermined direction; and a reflection type optical system having at least one reflecting surface which reflects the deflected light beam and guiding the light beam reflected by the reflecting surface to an image forming medium.

Another aspect of the present invention is an image forming apparatus according to the first aspect, wherein the deflector includes a two-dimensional micro-scanner having a reflecting mirror which is capable of rotating around two axes perpendicular to each other.

In the image forming apparatus according to the first aspect of the present invention, a plurality of light beams having different wavelengths are emitted from the laser light sources and are each reshaped by the reshaping section. Some of laser light sources use a wavelength converter element such as a semiconductor laser or a second harmonic generation (SHG), and may oscillate a light beam corresponding to each of R, G and B or a light beam having a wavelength in a near infrared region. The laser light sources are controlled by the control section. That is, the control section supplies, based on image data, control signals for modulating a plurality of light beams to the laser light sources. The reshaping section may be a lens which is typically a collimator lens. The light beams reshaped by the reshaping section are deflected by the deflector. The deflector is equipped with a reflecting mirror which reflects an incident light beam, and rotates the reflecting mirror around a previously set axis in a predetermined direction to deflect the light beam. For example, a reflecting mirror having a rotating shaft on the reflecting surface thereof, such as a micro-scanner put to practical use in recent years, is used. The micro-scanner allows a light beam to scan in a two-dimensional manner by rotating the mirror. As a result, a large-size equipment such as a rotating polygon mirror is not required. The deflected light beam is guided by the reflection type optical system to an exposure medium. The reflection type optical system has no transmission material comprised of glass material such as a lens. Therefore, even if light beams have different wavelength or different colors, there is no need of consideration for aberration such as chromatic aberration.

In other words, due to the use of the aforementioned reflection type optical system, consideration of wavelength dependency is eliminated, which wavelength dependency is apt to be caused when an optical system using a transmission medium having a refractive index, such as a lens, is used. Since no consideration for wavelength dependency is required, the degree of freedom in various optical designs increases and the design can be simplified. As a result, an optical system having a simple structure and a high reliability can be formed. Further, since wavelength dependency is eliminated in the aforementioned reflection type optical system, when a color image is formed by using a plurality of light beams having different wavelengths, no consideration of chromatic aberration for each light beam is required and a design with a plurality of light beams having different wavelengths considered is not required. Therefore, a plurality of light beams having different wavelengths can be readily employed, and the degree of freedom in various optical designs increases, and further, the design can be simplified. As a result, an optical system having a simple structure and a high reliability can be formed.

Further, if only the aforementioned reflection type optical system is used, the shape of a reflecting portion can be freely set and deflective thickness thereof can be lessened. In an optical system using a transmission medium having a refractive index, such as a lens, a fixed shape, that is, deflective thickness thereof is required. For this reason, the reflection type optical system can be easily manufactured and the structure thereof can be simplified. Further, the use of the reflection type optical system allows reduction of the number of parts which are necessary when transmission medium to be used, having a refractive index, such as a lens, is used. Due to the structure of the system being simplified, a small-size apparatus can be provided. Moreover, since it suffices that the reflecting portion is taken into consideration in the reflection type optical system, the thickness of the material can be freely set. For this reason, the reflecting portion can be made into a shape which can be easily manufactured, or a shape with the apparatus structure considered. As a result, the degree of freedom in design increases and a small-size apparatus can be provided.

According to the second aspect of the present invention, the aforementioned laser light sources preferably emit at least three laser beams corresponding to color hues of cyan, magenta and yellow. As a result, light beams corresponding to characteristics of a recording material such as a photosensitive material having spectral sensitivity characteristics can be utilized.

According to the third aspect of the present invention, the rotation of the reflecting mirror in the predetermined direction at the deflector is effected such that that the reflecting mirror is repeatedly rotated alternately in a one direction and a opposite direction. As the reflecting mirror of the deflector, a reflecting mirror which rotates in one direction can also be used. The scanning range by the deflector is previously determined. Accordingly, it suffices that the deflector may deflect a light beam at least in the scanning range. Due to the reflecting mirror being repeatedly rotated alternately in a one direction and a opposite direction, a sufficient scanning range can be maintained and it is not necessary that the mirror can rotate all round (namely, it suffices that the mirror can rotate by a predetermined angle). As a result, a space occupied by rotation of the reflecting mirror can be reduced.

Further, a micro-scanner can be used as the deflector. In the micro-scanner, a movable portion is light in weight. Therefore, a change in the performance of the micro-scanner caused by a mounting attitude (mounting position) thereof is small, and a unit can be freely disposed.

When the micro-scanner, which is an example of a mirror scanning system which rotates a reflecting mirror to deflect a light beam, is used as the deflector, an optical face tangle error correction required when a light beam is deflected by using a rotating polygon mirror is not necessary. The reason is that the movable portion of the micro-scanner is light in weight and a tilt of the reflecting surface is extremely small. Accordingly, a correction optical system using a cylindrical lens or the like required by optical face tangle error correction becomes unnecessary. As a result, the optical system can be simplified and a scanning system can be formed at a low cost. Particularly, in a case in which a color image is formed by a scanning system using a plurality of light beams having different wavelengths, when a rotating polygon mirror is used, an optical face tangle error correction for laser scanning system with a plurality of wavelengths each considered becomes necessary, thereby resulting in a complicated structure and increase in costs. However, when a micro-scanner is used, the optical face tangle error correction for laser scanning system with wavelengths each considered becomes unnecessary. As a result, the structure can be largely simplified and can be provided at a low cost.

Further, when the micro-scanner is used as the deflector, a detector required for detecting a start point or an end point at the time of scanning of a light beam is not necessary. The reason is that an angle detecting circuit or a direction detecting circuit can be incorporated in the micro-scanner and a driving signal can be used, and also that driving signal, by which setting of the position of the reflecting surface can be accurately carried out, can be used. For this reason, it is not necessary to use a detection optical system using a photo detector required for detecting starting or completing scanning, that is, for detecting a start point or an end point. Accordingly, the optical system can be simplified and the scanning system can be formed at a low cost.

In accordance with the fourth aspect of the present invention, at least one of the reflecting surfaces can be formed so as to have arcsine characteristics as the property of reflecting an incident light beam. As is well known, reflected light is caused to scan due to rotation of the reflecting mirror. In this case, the light beam is caused to scan at a scanning speed corresponding to a rotation angular speed of the reflecting mirror. However, it is preferable that the light beam is caused to scan at a constant speed in an image exposure operation. In the present invention, the light beam is deflected by rotating the reflecting mirror in the predetermined direction. Preferably, the reflecting mirror is repeatedly rotated alternately in one direction and opposite direction by rotating ranges which are distributed equally on the basis of a position near the center of the scanning range. As a result, horizontal (left and right) or vertical uniformity of scanning by deflection of a light beam is maintained. In this case, the scanning speed at the center of the scanning range is different from the scanning speed at the edge region thereof. That is, the light beam is deflected with sine characteristics. Accordingly, when at least one of the reflecting surfaces is formed so as to have arcsine characteristics as the property of reflecting an incident light beam, the reflected light beam is caused to scan substantially at a constant speed.

Further, the deflective thickness (that is, the thickness at a position apart from the central axis) of the reflecting surface having arcsine characteristics is small compared with a spherical reflecting surface. That is, although the deflective thickness of the spherical reflecting surface gradually increases from the central portion, the deflective thickness of the reflecting surface having arcsine characteristics becomes smaller due to the arcsine characteristics. Accordingly, the precision in plastics forming of the reflecting surface having arcsine characteristics can be easily maintained. Further, when dynamic distortion of the deflector may occur during rotation, a reflecting surface in consideration of the distortion can be formed.

Moreover, a sagittal height (that is, a distance from a tangential plane to a reflecting point) of the reflecting surface having arcsine characteristics is small compared with a reflecting surface having an fθ correcting function in using a rotating polygon mirror. That is, although the sagittal height of the reflecting surface having an fθ correcting function gradually increases from the central portion, the sagittal height of the reflecting surface having arcsine characteristics in the periphery thereof becomes smaller. Accordingly, since the reflecting surface having arcsine characteristics has a small deflective thickness or sagittal height, the precision in plastics forming of the reflecting surface can be easily maintained. Further, when dynamic distortion of the reflecting surface may occur during rotation, a reflecting surface in consideration of the distortion can be formed.

The reflecting surface having arcsine characteristics easily allows a reflected light beam to scan substantially at a constant speed. Accordingly, in a case of that the reflecting surface having arcsine characteristics are formed, the deflective thickness or sagittal height thereof can be made smaller. Therefore, the precision in plastics forming of the reflecting surface can be easily maintained and the reflecting surface can be easily manufactured. Further, the structure of the apparatus can be further simplified and a small-size apparatus can be provided.

In accordance with the fifth aspect of the present invention, an expansion coefficient of at least a portion of members forming the reflecting surfaces in the reflection type optical system is preferably made substantially equal to that of a housing body of the image forming apparatus. The reflection type optical system is fixed to a housing body such as a housing of the apparatus. The housing body may expand or contract due to a change of temperature. For this reason, the reflection type optical system and the housing body may differ from each other in the expansion or the contract (coefficient) to cause a distortion, which may affect reflection characteristics of the optical system. Accordingly, when the expansion coefficient of the members which form the reflecting surface is made substantially equal to that of the housing body, a distortion can be prevented. More specifically, a ratio between an expansion coefficient of the housing body of the image forming apparatus and that of at least a portion of members which form the reflecting surface is preferably set to be ten or less, more preferably five or less, and most preferably made substantially equal thereto.

So long as a micro-scanner is used as the deflector, it is not necessary to provide a optical face tangle error correction function for a reflecting mirror located at the downstream side of the deflector, that is, it is not necessary to perform the optical face tangle error correction required at the time a light beam is deflected by using a rotating polygon mirror. Further, the reflection type optical system has no wavelength dependency, and therefore, a reflecting surface for multi-wavelength, which is comprised of a single reflecting mirror, can be defined by simply using a generalized function or a polynomial. For this reason, an optical design is simplified, and die forming or forming inspection of the reflecting mirror are also simplified, thereby allowing manufacturing at a low cost. Further, when a single reflecting mirror is used, a small-sized structure can be provided.

According to the sixth aspect of the present invention, the control section can be formed as modulation systems corresponding to each of the laser light sources. The laser light sources emit a plurality of light beams of different wavelengths. The plurality of light beams of different wavelengths may differ in the property for oscillating according to the wavelength thereof or on/off characteristics of the light beam. For this reason, an internal modulation system or an external modulation system is used for each of the laser light sources which emit a plurality of light beams. The internal modulation system includes pulse-width modulation in which oscillation is controlled by pulse width, and intensity modulation based on the intensity of a light beam. The external modulation system includes an acousto-optical modulator which modulates or deflects a light beam by causing an incident light beam to be transmitted or diffracted in accordance with an electric signal of a frequency applied to an electrode.

When, as the control section, a modulation system corresponding to a laser light source is set for each of laser light sources, it is preferable that a corresponding, that is, suitable modulation system, previously set for each laser light source is set. The reason is that the modulation system for laser light sources includes external modulation and direct modulation, and the performance required by each laser light source itself varies depending on the modulation system. For this reason, it is preferable that the modulation system is set so as to correspond to the performance required by a laser light source to be used.

Due to a modulation system corresponding to a laser light source being set, as the control section, for each of laser light sources, a small-size apparatus can be realized. For example, when the same modulation system is employed for all of the laser light sources, it is necessary to collect the laser light sources into one and set a position at which light beams are modulated, at one point. Therefore, arrangement and positioning of elements needs to be examined in detail. Accordingly, when a modulation system is set so as to correspond to each laser light source, restrictions on the arrangement and the positioning of laser light sources are alleviated and a space is easily maintained. As a result, a small-size apparatus can be realized and low-cost manufacturing can be achieved by a simple structure.

According to the seventh aspect of the present invention, the reshaping section causes the optical axis of the light beam and the center optical axis of the reshaping section to cross each other. When a semiconductor laser is used, a near-field pattern and a far-field pattern are different. For this reason, reshaping of a light beam is carried out by the reshaping section, but an astigmatic difference may remain. Accordingly, when the center optical axis of the reshaping section and the optical axis of the light beam are caused to cross each other, for example, a collimator lens is inclined to the optical axis, the astigmatic difference can be restrained.

In recent years, a micro-scanner which rotatably holds the deflecting mirror around two axes (a first axis and a second axis) perpendicular to each other has been put to practical use. In the eighth aspect of the present invention, the micro-scanner and the position correcting section are used so as to adjust a sub-scanning-direction position of the reflected light by using the position correcting section.

The control section which forms the position correcting section may be provided in the micro-scanner or provided outside the micro-scanner. Further, an optical face tangle of the micro-scanner during rotation is small, and therefore, an optical face tangle error correction for laser scanning system may not be built in.

In accordance with the ninth aspect of the present invention, a space between adjacent main scanning lines can be made uniform. The image forming apparatus mentioned herein is, for example, a raster scanning device.

In accordance with the tenth aspect of the present invention, the position of the reflected light in the sub-scanning direction is adjusted by the position correcting section. When this adjustment is carried out, curvature (hereinafter referred to as bow) of a main scanning line on the recording material is also corrected. When bow is corrected, for example, a locus of scanning light when a main scanning line is generated is curved. The bow is apt to occur when the reflection type optical system is used, accordingly, this correction is particularly an effective means.

In the tenth aspect of the present invention, it is not necessary to separately provide a means for correcting bow. The apparatus can be made smaller and simplified.

In accordance with the eleventh aspect of the present invention, when a region irradiated with no reflected light exists on the recording material, a desired density is not obtained in a portion including the region or density unevenness caused by an error of a spot position may become conspicuous.

In the eleventh aspect of the present invention, there is no possibility that a region irradiated with no reflected light exists on the recording material. Even if an error occurs at a spot position, a satisfactory image quality can be easily obtained.

In accordance with the twelfth aspect of the present invention, the time interval between the time the right-handed end portion of a main scanning line is irradiated with spot light, and the time the right-handed end portion of a subsequent main scanning line is irradiated with spot light, and the time interval between the time the left-handed end portion of a main scanning line is irradiated with spot light, and the time the left-handed end portion of a subsequent main scanning line is irradiated with spot light, are equal to each other in a case of one-way scanning, but are different from each other in a case of reciprocating scanning. Further, in the case of reciprocating scanning, the time interval between the time the central portion of a main scanning line is irradiated with spot light, and the time the central portion of a subsequent main scanning line is irradiated with spot light becomes an intermediate value or thereabouts between the above mentioned time interval of "right-handed end portions" and the time interval of "left-handed end portions".

If the above mentioned time intervals differ from each other, density unevenness may be caused by characteristics of the recording material. Particularly, in the case of a color image, density unevenness remarkably occurs.

Although the time intervals of the right-handed end portions case and the left-handed end portions case of the main scanning lines differ from each other due to reciprocating scanning, the intensity of spot light or the emission time light is emitted is adjusted at each light-irradiation position, thereby making it possible to prevent occurrence of density unevenness in an image to be obtained.

Further, thirteenth to nineteenth aspects of the present invention are also provided.

In accordance with the thirteenth aspect of the present invention, in a deflector in which a deflecting (reflecting) mirror is rotatable biaxially, a micro-scanner is provided at a rotating shaft of a galvanometer scanner so that a reflecting surface of the deflecting mirror can oscillate around an axis perpendicular to the rotating shaft, and due to rotation of the micro-scanner and rotation of the galvanometer scanner, light reflected by the deflecting mirror can be caused to scan in a two-dimensional manner.

As a result, a small size deflector having a combination of the galvanometer scanner and the micro-scanner and allowing two-dimensional scanning of light is realized. Here, light deflected by the deflecting mirror is generally laser light.

The micro-scanner may be provided so as to be rotatable around a single axis or two axes. Even if the micro-scanner which is rotatable around a single axis (that is, a one-dimensional micro-scanner) is used, light can be caused to sufficiently scan in a two-dimensional manner. Further, curvature of a scanning line may be corrected by using the micro-scanner which is rotatable around two axes.

A fourteenth aspect of the present invention is an image forming apparatus in which the deflector according to the thirteenth aspect is provided and an image is formed by imaging scanning light scanned by the deflector, using an image-forming optical system.

As a result, when an image is formed by light scanning of an image forming apparatus, light scanning can be carried out by the deflector in a two-dimensional manner. Therefore, the structure of the optical system can be remarkably simplified as compared with a conventional system. Accordingly, an image forming apparatus having a simple and small-size structure is realized.

In accordance with a fifteenth aspect of the present invention in the fourteenth aspect, light scanning is carried out in a main scanning direction by oscillation of the micro-scanner, and light scanning is carried out in a sub-scanning direction by rotation of the galvanometer scanner around the rotating shaft thereof.

As a result, light scanning can be carried out by the micro-scanner in the main-scanning direction at a high speed and scanning light can be moved by the galvanometer scanner in the sub-scanning direction at a stabilized speed.

In accordance with a sixteenth aspect of the present invention, the driving frequency of the galvanometer scanner is $1/100$ or less of that of the micro-scanner in the fifteenth aspect.

As a result, an image whose image quality is sufficiently favorable can be formed.

In an optical recording device, an optical forming (3D) device, a display device or the like, proper pixel density is from 75 dpi to 2000 dpi in practical use in a case of that size of an object to be scanned is from A4 to A3 (scanning width is from 210 mm to 297 mm). One-way scanning or reciprocating scanning of the micro-scanner is properly performed, because of the structure thereof, in a condition in which the driving frequency is from 500 Hz to 3 kHz and a deflection efficiency is from 30% to 90%.

A main scanning speed is obtain by the following formula.

(main scanning speed)=(scanning width)×(driving frequency)×2[reciprocating scanning]/(deflection efficiency)

Accordingly, a proper main scanning speed is (from 210 mm to 297 mm)×(from 500 Hz to 3000 Hz)×2/(from 0.3 to 0.9). Namely, the proper main scanning speed is from 230 m/s to 6000 m/s.

Also, sub scanning speed is obtain by the following formula.

(sub scanning speed)=(25.4/(pixel density)×(driving frequency))×(1 or 2)[1 in a case of one-way scanning; 2 in a case of reciprocating scanning]

Accordingly, a proper main scanning speed is (25.4/(from 75 dpi to 2000 dpi)×(from 500 Hz to 3000 Hz)×(1 or 2). Namely, the proper sub scanning speed is from 6 m/s to 2000 m/s.

Accordingly, a proper ratio between the main scanning speed and the sub scanning speed (sub scanning speed/main scanning speed) is substantially from $1/1000000$ to $1/100$.

Further, when the scanning width is large, visual distance is generally large, Accordingly, it is desirable the scanning width is inverse proportion to the pixel density. Namely, when the scanning width is from 2100 mm to 2970 mm, proper pixel density is from 7.5 dpi to 200 dpi. Accordingly, in this case, it is desirable that the ratio between the main scanning speed and the sub scanning speed (sub scanning speed/main scanning speed) is more than or equal to $1/1000000$ to $1/100$ and less than or equal to $1/100$.

In accordance with a seventeenth aspect of the present invention, the image forming optical system is formed integrally with the rotating shaft of the galvanometer scanner in the fourteenth to sixteenth aspects.

As a result, the structure of the optical system in the image forming apparatus can be further simplified, thereby resulting in an image forming apparatus from being made still smaller.

In accordance with an eighteenth aspect of the present invention, the image forming apparatus according to the fourteenth to seventeenth aspects is an image recording apparatus in which an image is written in a recording material by light scanning of the deflector.

Since the scanning light can be moved by the deflector in the sub-scanning direction, the structure of the optical system can be simplified. As a result, an image recording apparatus having a simple structure and made smaller is realized.

In accordance with a nineteenth aspect of the present invention, the image forming apparatus according to the fourteenth to seventeenth aspects is a display device which displays an image by light scanning using the deflector.

Since the scanning light can be moved by the deflector in the sub-scanning direction, the structure of the optical system can be simplified. As a result, a display device having a simple structure and made smaller is realized.

Further, any features in the second through seventh aspects of the present invention can be applied to the eighth aspect of the present invention. Moreover, any features in the ninth through twelfth aspects of the present invention can be applied to the first aspect of the present invention.

DESCRIPTION OF THE PREFERRED EMBODIMENTS

Referring now to the attached drawings, a first embodiment of the present invention will be described hereinafter in detail. The present embodiment provides a structure in which the present invention is applied to an image exposure apparatus. An image forming apparatus according to the present embodiment is formed as an image forming apparatus in which an image is formed by using a light and heat sensitive color recording material as a recording material. In this image forming apparatus, a light and heat sensitive color recording material is used in which three light and heat sensitive monochromatic recording layers which respectively form colors in hues of yellow, magenta and cyan are formed in layers on a support.

[Image Forming Apparatus]

Figure 2:
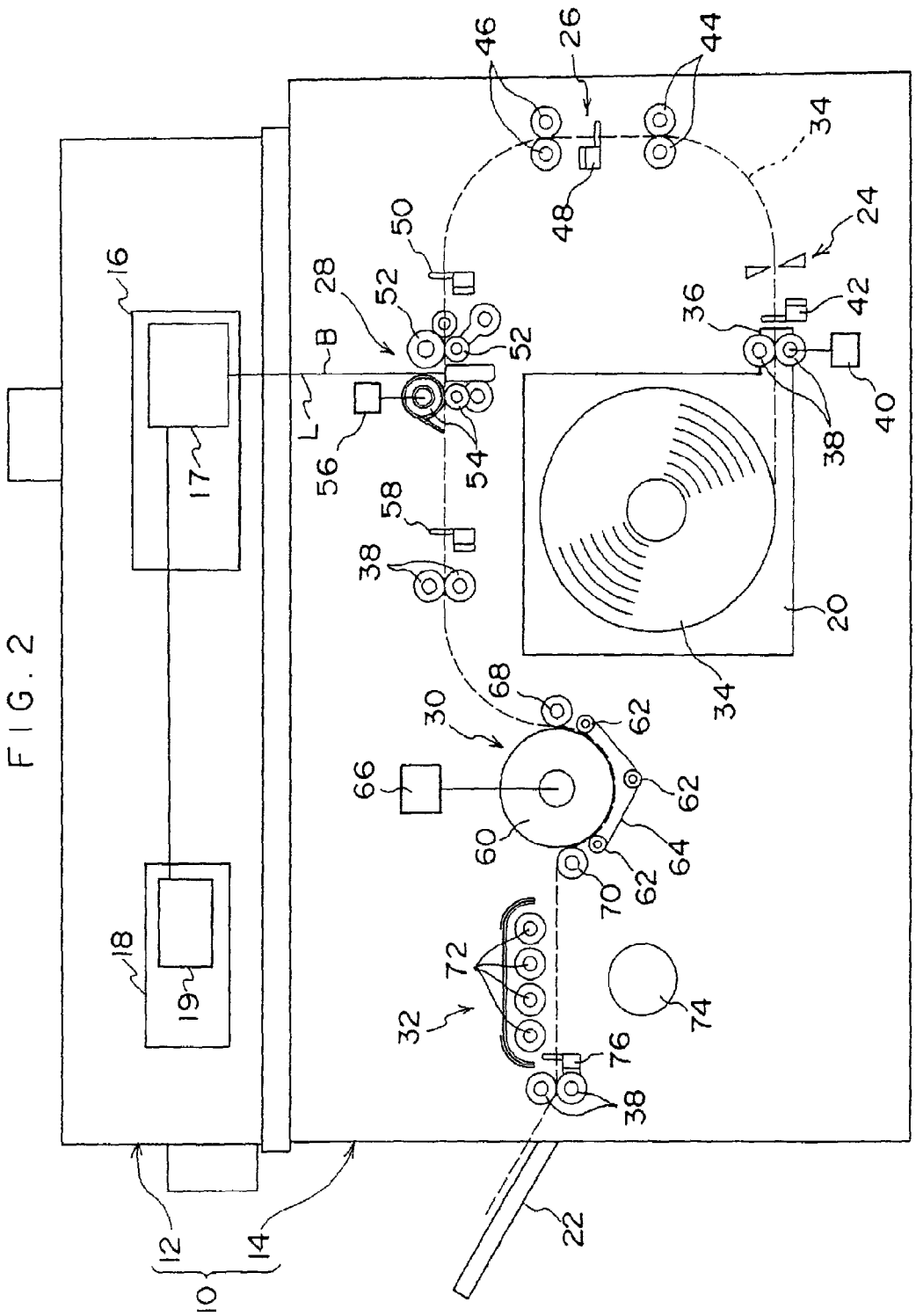
FIG. 2 is a structural diagram which schematically shows an image forming apparatus according to the embodiment of the present invention.

As shown in FIG. 2, an image forming apparatus 10 is structured in such a manner that an electrical equipment section 12 is disposed at an upper side of the apparatus main body and an image-formation processing section 14 is disposed at a lower side thereof.

The electrical equipment section 12 includes an image processing section 16 and a control section 18, and has the function of photoelectrically reading light projected on an image obtained by photographing on a film by means of an image sensor such as a CCD sensor, converting analog image data of the read film into digital image data, effecting predetermined image processing such as gradation correction for the converted digital image data, and deriving output image data for image recording (an exposure condition).

Further, the electrical equipment section 12 is provided with an interface (not shown) such as a keyboard which can be utilized for inputting an operating instruction for an order of printing given by a user. The control section 18 is structured so as to control various devices of the image-formation processing section 14 based on the operating instruction of the user to allow execution of various processing. At the lower side of the electrical equipment section 12, the image-formation processing section 14 in which a magazine 20 is removably mounted is disposed.

Within the image-formation processing section 14, a cutter portion 24, a speed change region 26, a recording processing portion 28, a development processing portion 30 and a fixing processing portion 32 are disposed sequentially from the upstream side along a predetermined conveying path in which the magazine 20 is disposed at the most upstream side and an exhaust tray 22 of finished prints is disposed at the most downstream side.

The magazine 20 is formed as a box-shaped body having a light-shielding function, in which a light and heat sensitive color recording material 34 formed as an elongated band-shaped sheet member is accommodated in the state of being wound on a shaft core member in the form of a roll. Further, a pull-out opening 36 is provided so as to protrude from the magazine and pull out the light and heat sensitive color recording material 34 from the roll of light and heat sensitive color recording material 34 accommodated in the magazine 20 to the conveying path.

Conveying rollers 38 are disposed within the image-formation processing section 14 at required positions along the conveying path to form a conveying device for conveying the light and heat sensitive color recording material 34 along the predetermined conveying path. The pull-out conveying rollers 38 at the most upstream side are provided at the pull-out opening 36 of the magazine 20, and the light and heat sensitive color recording material 34 is conveyed on the conveying path in such a manner that it is nipped at the pull-out opening 36 of the magazine 20 by a roller pair which is made to move close to or away from each other by a driving device such as a solenoid (not shown) and the pull-out conveying roller 38 is driven to rotate by a photosensitive material supplying motor 40.

A photosensitive material pull-out sensor 42 is provided in the vicinity of the pull-out opening 36 to detect the leading and trailing ends of the light and heat sensitive color recording material 34 conveyed from the pull-out opening 36. The cutter portion 24 is provided at the downstream side of the photosensitive material pull-out sensor 42. The cutter portion 24 is used to cut the light and heat sensitive color recording material 34 into portions of a predetermined size (size A4 or A5).

The speed change region 26 is provided at the downstream side of the cutter portion 24 so as to be capable of varying a linear speed at which the light and heat sensitive color recording material 34 is pulled out and conveyed. In the speed change region 26, first speed change conveying rollers 44 are disposed at the upstream side of the conveying path and second speed change conveying rollers 46 are disposed at a predetermined interval from the first rollers. The first speed change conveying rollers 44 and second speed change conveying rollers 46 can be driven to rotate at different speeds by controlling to change an exciting frequency of each constant-voltage pulse motor.

A first timing sensor 48 for detecting leading and trailing ends of the light and heat sensitive color recording material 34 is disposed at a predetermined position between the first speed change conveying rollers 44 and the second speed change conveying rollers 46. The first timing sensor 48 detects the time at which the light and heat sensitive color recording material 34 is cut into portions of size A5, and also detects the time of a continuous start (the time of starting a speed change operation). A second timing sensor 50 is disposed at the downstream side of the second speed change conveying rollers 46 and at the upstream side of the recording processing portion 28. The second timing sensor 50 detects the time at which the light and heat sensitive color recording material 34 is cut into portions of size A4, and also detects the time of starting exposure.

In the recording processing portion 28, a conveying roller pair 52 and a conveying roller pair 54 are disposed sequentially from the upstream side along the conveying direction. The interval between the conveying roller pairs 52 and 54 in the conveying direction (that is, the sub-scanning direction) is sufficiently made close, and light beam L is illuminated onto the light and heat sensitive color recording material 34 at an exposure position between the conveying roller pairs 52 and 54 while being deflected in the main scanning direction by a light beam scanning device 17 (described later in detail) provided in the image processing section 16.

The light beam scanning device 17 disposed in the image processing section 16 forms a scanning-exposure means for exposing by scanning the light and heat sensitive color recording material 34 by a conveying operation of the conveying roller pairs 52 and 54 in a two-dimensional manner. In the light beam scanning device 17 disposed in the image processing section 16, light beams L of three primary colors modulated in accordance with (an exposure density which corresponds to) an image to be optically recorded are deflected in the main scanning direction, and at the same time, caused to scan the light and heat sensitive color recording material 34 held at the exposure position.

The conveying roller pairs 52 and 54 are controlled and driven to rotate by a sub-scanning motor 56 which is a constant-voltage pulse motor. At the time the light and heat sensitive color recording material 34 is exposed by scanning, the sub-scanning motor 56 rotates by an amount corresponding to the density of pixels along the sub-scanning direction synchronously with the time at which one scanning of the light beam scanning device disposed in the image processing section 16 is completed. As a result, the light and heat sensitive color recording material 34 is exposed, by two-dimensional scanning, to the light beams L at the exposure position, and a latent image is formed in a frame region thereof.

A photosensitive material conveying sensor 58 is disposed at a predetermined position downstream from the conveying roller pair 54. Conveying rollers 38 are disposed downstream from the photosensitive material conveying sensor 58, and a developing processing portion 30 is disposed farther downstream. In the developing processing portion 30, a heating drum 60 and an endless conveying belt 64 are provided. The conveying belt 64 is laid to span over three guide rolls 62 into pressure-contact with the outer peripheral surface of the heating drum 60 in the range of a predetermined angle.

The heating drum 60 is controlled and driven to rotate by a developing drum motor 66 (a constant-voltage pulse motor) and rotated synchronously with the conveying belt 64. The heating drum 60 is equipped with a drum heater (not shown) in which a halogen lamp is used, and a developing drum thermistor (also not shown), and the outer peripheral surface of the heating drum 60 is held by being heated to a predetermined temperature. Further, a guide roller 68 is disposed at an inlet of the heating drum 60 so as to come into pressure-contact with the light and heat sensitive color recording material 34. A guide roller 70 for separating the light and heat sensitive color recording material 34 from the heating drum 60 is disposed at an outlet of the heating drum 60.

The heating drum 60 and the conveying belt 64 thus structured are provided so as to heat the light and heat sensitive color recording material 34 while rotating the color recording material closely in contact with the outer peripheral surface of the heating drum 60, and perform an operation for conveying the color recording material to the downstream side.

The fixing processing portion 32 is disposed at the downstream side of the guide roller 70. In the fixing processing portion 32, a fixing light source 72 is disposed at the side of a light and heat sensitive recording layer of the light and heat sensitive color recording material 34. The fixing light source 72 is formed by a plurality of white fluorescent lamps, and an image forming surface of the light and heat sensitive color recording material 34 being conveyed on the conveying path is irradiated with light used for light fixing processing. As a result, discoloring processing is performed.

Further, in the fixing processing portion 32, a fixing heater 74 is disposed at the side of the rear surface of the light and heat sensitive color recording material 34. When the fixing light source 74 applies the light used for fixing processing to the light and heat sensitive color recording material 34, the light and heat sensitive color recording material 34 is preheated to a predetermined temperature so that stable fixing processing can be carried out. A photosensitive material exhaust sensor 76 is disposed at the downstream side of the fixing processing portion 32.

Moreover, conveying rollers 38 disposed downstream from and adjacent to the photosensitive material exhaust sensor 76 allows the light and heat sensitive color recording material 34 in the form of a finished print to be discharged into the exhaust tray 22.

Next, operation of the image forming apparatus according to the present embodiment having the aforementioned structure will be schematically described.

First, in the image forming apparatus 10, when a user inputs output image data for image recording with an exposed film being loaded in the apparatus, and also inputs an operating instruction for an order of printing from an interface such as a keyboard, the control section 18 starts control for preparing prints by the image forming apparatus 10.

When the light and heat sensitive color recording material 34 used for a first print is conveyed in the state in which no exposure processing is carried out in the recording processing portion 28 of the image forming apparatus 10, that is, in the state in which the light and heat sensitive color recording material 34 is not pulled out onto the conveying path, the control section 18 rotates the pull-out conveying rollers 38, the first speed change conveying rollers 44, and the second speed change conveying rollers 46 at a predetermined number of revolutions of relatively high speed to convey the light and heat sensitive color recording material 34, and when the leading end of the light and heat sensitive color recording material 34 is detected by the second timing sensor 50, the light and heat sensitive color recording material 34 is stopped.

Next, the elongated light and heat sensitive color recording material 34 in a stopped state is cut by the cutter portion 24 into portions of size A4.

When a predetermined time measured by a timer has elapsed from the time at which the leading end of the light and heat sensitive color recording material 34 is detected by the second timing sensor 50, the control section 18 rotates the pull-out conveying rollers 38, the first speed change conveying rollers 44 and the second speed change conveying rollers 46 at a predetermined number of revolutions of relatively low speed to convey the light and heat sensitive color recording material. Exposure processing is performed for the light and heat sensitive color recording material 34 being conveyed in the recording processing portion 28.

[Light Beam Scanning Device]

Next, the light beam scanning device 17 will be described in detail.

Figure 1:
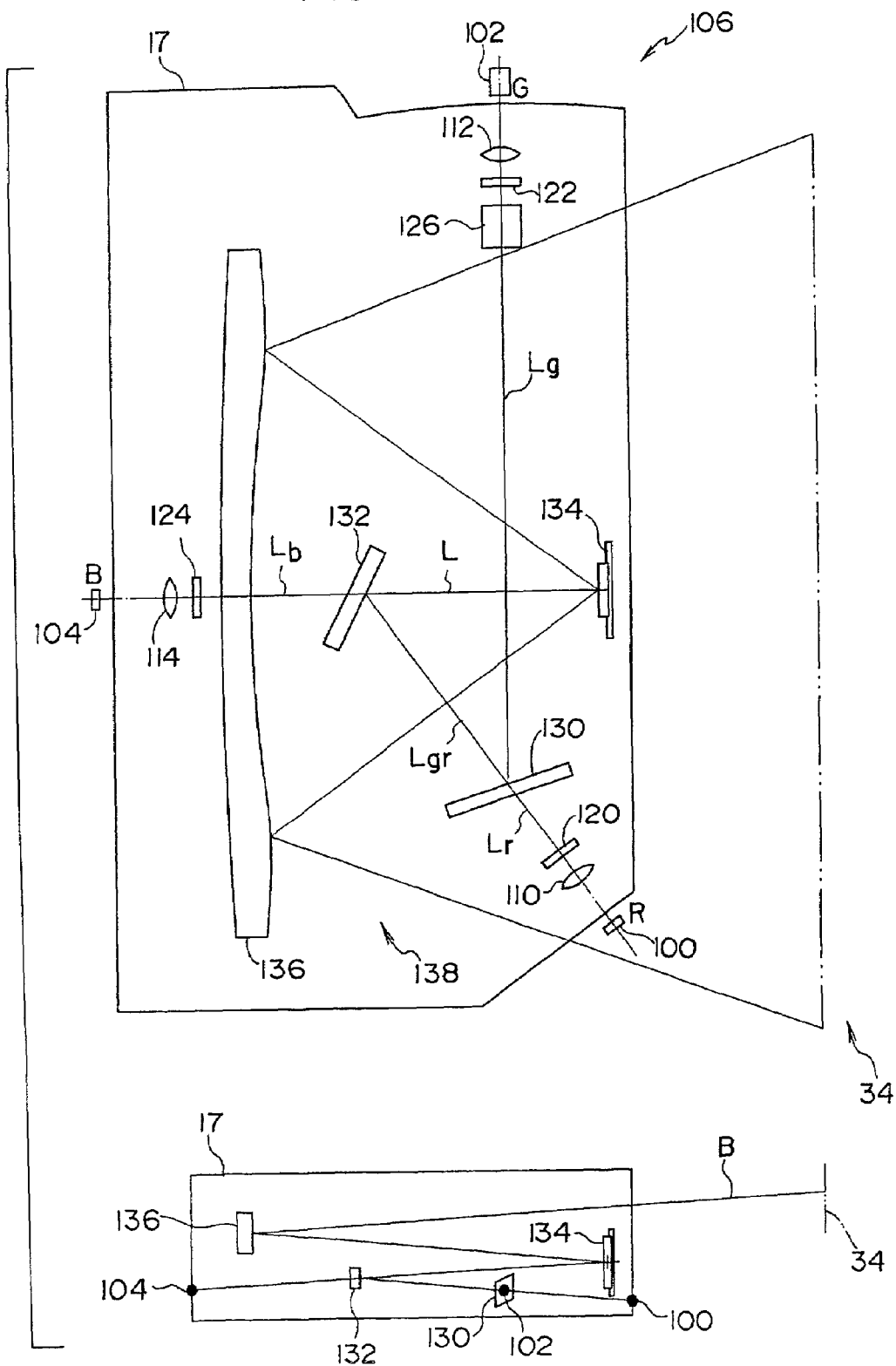
FIG. 1 is a block diagram which schematically shows the structure of a light beam scanning device according to an embodiment of the present invention.

FIG. 1 schematically shows the structure of the light beam scanning device 17 according to the present embodiment to which the present invention can be applied. The light beam scanning device 17 of the present embodiment is structured so as to include a light source section 106, and a reflection type optical system 138 including a deflector 134. The light source section 106 is provided so as to emit a light beam (laser beam) for exposure of an image, and is formed from a plurality of laser light sources such as a semiconductor laser.

The light source section 106 includes three laser light sources, that is, a red-light laser light source 100, a green-light laser light source 102 and a blue-light laser light source 104. These laser light sources each may have the maximum intensity in the wavelength range of 300 to 1100 nm in correspondence with spectral sensitivity characteristics of the light and heat sensitive recording material. In the present embodiment, a semiconductor laser having a central oscillation wavelength of 780 nm is used as the red-light laser light source 100. A semiconductor laser having a central oscillation wavelength of 500 nm is used as the green-light laser light source 102. Further, a semiconductor laser having a central oscillation wavelength of 400 nm is used as the blue-light laser light source 104. Although described later in detail, a modulation system varies according to an element used in the light source section in the present embodiment. That is, in the red-light laser light source 100 and the blue-light laser light source 104, laser light is directly modulated. Further, in the green-light laser light source 102, laser light is modulated by an external modulator (AOM) 126. A modulation circuit 19 (described later in detail) used for the modulation is accommodated in the control section 18.

The red-light laser light source 100, the green-light laser light source 102 and the blue-light laser light source 104, which form the light source section 106, are disposed separately from one another because laser light emitted from the laser light sources are synthesized. The red-light laser light source 100 is provided in the vicinity of the end at one side surface of the light beam scanning device 17 (in the vicinity of the lower right position in FIG. 1). The green-light laser light source 102 is provided in the vicinity of the end at another side surface of the light beam scanning device 17 (in the vicinity of the upper right position in FIG. 1). The blue-light laser light source 104 is provided in the vicinity of the back surface central position facing the end at the side surface of the light beam scanning device 17 (in the vicinity of the central position of the left side in FIG. 1).

As described above, the red-light laser light source 100, the green-light laser light source 102 and the blue-light laser light source 104 are disposed separately from one another so that the light source portions are not collected at one place. It is not necessary to specifically examine the arrangement of optical elements. Accordingly, restrictions on the arrangement of laser light sources are alleviated and a space therefor is easily maintained. As a result, a small-size apparatus can be provided.

The red-light laser light source 100 is provided with a collimator lens 110 and an optical filter 120 such as an ND filter, sequentially therefrom. Accordingly, laser light from the laser light source 100 is transmitted through the collimator lens 110 and the optical filter 120 and emitted as red laser light Lr.

The green-light laser light source 102 is provided with a collimator lens 112 and an optical filter 122 sequentially therefrom. An external modulator 126 comprised of an acousto-optic modulator (AOM) is also provided. Accordingly, laser light from the laser light source 102 is transmitted through the collimator lens 112, the optical filter 122 and the external modulator 126 and emitted as green laser light Lg.

The blue-light laser light source 104 is provided with a collimator lens 114 and an optical filter 124 such as an ND filter, sequentially therefrom. Accordingly, laser light from the laser light source 104 is transmitted through the collimator lens 114 and the optical filter 124 and emitted as blue laser light Lb.

In the present embodiment, in order to restrain an astigmatic difference, the respective optical axes on center of the collimator lenses 110, 112 and 114 are each made to cross an optical path of laser light.

Reflecting mirrors 130 and 132, a deflector 134 and an arcsine mirror 136, which form the reflection type optical system 138, are disposed in that order along the optical path at the side from which light is emitted from the light source section 106, that is, the side to which the laser light Lr, Lg and Lb reaches.

Laser light from the green-light laser light source 102 is transmitted through the collimator lens 112, the optical filter 122 and the external modulator 126 and emitted as the green laser light Lg. The reflecting mirror 130 is provided at the side at which the laser light is emitted from the external modulator 126. The reflecting mirror 130 is formed so as to reflect only the green laser light Lg. A dichroic mirror may be typical of the reflecting mirror 130.

The red-light laser light source 100 is provided at the side at which laser light is transmitted through the reflecting mirror 130, which transmitted light has an optical axis coincident with an optical path of laser light reflected by the reflecting mirror 130. The reflecting mirror 130 reflects only the green laser light Lg and the red laser light Lr is transmitted therethrough. Accordingly, laser light from the red-light laser light source 100 is transmitted through the collimator lens 110 and the optical filter 120, and emitted as the red laser light Lr, and further transmitted through the reflecting mirror 130 and synthesized with the laser light Lg. As a result, laser light Lgr having color components of red and green is propagated through a reflected light path from the reflecting mirror 130.

The reflecting mirror 132 is provided on a line extending from the reflected light path of the reflecting mirror 130. The reflecting mirror 132 is structured so as to reflect the red laser light Lr and green laser light Lg. The reflecting mirror 132 merely may be formed so as to transmit only at least the blue laser light Lb, and is not limited only to the structure in which the red laser light Lr and green laser light Lg are merely reflected. A dichroic mirror may be typical of the reflecting mirror 132.

The deflector 134 is provided at the side at which laser light is reflected by the reflecting mirror 132, and laser light Lgr reflected by and transmitted through the reflecting mirror 130 is reflected by the reflecting mirror 132 and led to the deflector 134. The blue-light laser light source 104 is provided at the side at which laser light is transmitted through the reflecting mirror 132, that is, in the vicinity of the back surface central position of the light beam scanning device 17, wherein an optical axis coincident with an optical path of laser light reflected by the reflecting mirror 132 is formed. The reflecting mirror 132 reflects the red/green laser light Lgr, and therefore, transmits the blue laser light Lb therethrough. Accordingly, laser light from the blue-light laser light source 104 is transmitted through the collimator lens 114 and the optical filter 124 and emitted as the blue laser light Lb, and further transmitted through the reflecting mirror 132 and synthesized with the laser light Lgr.

As a result, laser light L having color components of red, green and blue is propagated onto the reflected light path from the reflecting mirror 132 and led to the deflector 134. The arcsine mirror 136 is provided at the side at which the laser light is reflected by the deflector 134.

The reflecting mirrors 130 and 132, deflector 134 and arcsine mirror 136 are each disposed so that incident and emitted light are located at a predetermined angle to a normal line of each mirror without optical paths crossing each other.

The deflector 134 is comprised of a micro-scanner which allows one-dimensional or two-dimensional scanning of laser light (in the present embodiment, one-dimensional scanning of laser light, which will be described later in detail). The deflector 134 is disposed so that the normal line thereof at the time of operating (in the state of being driven by a driver) oscillates substantially uniformly (vertically in FIG. 1) as compared with the normal line at rest (in the state of not being driven by a driver).

Accordingly, light beam L from the reflecting mirror 132 is made incident on the deflector 134 from a direction which substantially coincides with the normal line at rest (the state of not being driven by a driver). Due to the deflector 134 being operated (being driven by a driver), the light beam is deflected uniformly (vertically in FIG. 1).

The light beam deflected by the deflector 134 is reflected by the arcsine mirror 136 and led to the light and heat sensitive color recording material 34. The arcsine mirror 136 is used to adjust a linear speed of light beam which is not made uniform by being deflected by the deflector 134 (described later in detail).

In the present embodiment, laser light from the red-light laser light source 100 is modulated by directly modulating a signal supplied to the laser light source 100 (in the present embodiment, pulse-width modulation). The modulated laser light from the red-light laser light source 100 is collimated by the collimator lens 110 and transmitted through the optical filter 120. The transmitted light is transmitted through the reflecting mirror 130 and reflected by the reflecting mirror 132, and thereafter, guided to and deflected by the deflector 134. The deflected light beam is reflected by the arcsine mirror 136 and led to the light and heat sensitive color recording material 34.

Laser light from the green-light laser light source 102 is modulated by the external modulator 126. That is, the external modulator 126 is used to modulate the intensity of each laser light in accordance with an inputted modulating signal. The laser light whose intensity has been modulated is collimated by the collimator lens 110 and transmitted through the optical filter 120, and further reflected by the reflecting mirrors 130 and 132, sequentially, and guided to and deflected by the deflector 134. Thereafter, the deflected laser light is reflected by the arcsine mirror 136 and led to the light and heat sensitive color recording material 34.

Laser light from the blue-light laser light source 104 is modulated by directly modulating a signal supplied to the laser light source 104 (in the present embodiment, intensity modulation). The modulated laser light from the blue-light laser light source 104 is collimated by the collimator lens 110 and transmitted through the optical filter 120, and further transmitted through the reflection mirror 132 and guided to and deflected by the deflector 134. Thereafter, the deflected laser light is reflected by the arcsine mirror 136 and led to the light and heat sensitive color recording material 34.

Thus, in the present embodiment, the laser light emitted from the light source section is guided only by the reflection type optical system to the light and heat sensitive color recording material 34. Accordingly, there is no possibility that laser light be transmitted through a medium having a refractive index, such as a glass material, and therefore, no correction for each of light beams having different wavelengths is required. As a result, optical design can be simplified and the light beam scanning device can be formed simply.

In other words, laser light is guided only by the reflection type optical system to the light and heat sensitive color recording material 34. An optical path only comprised of reflected laser light eliminates wavelength dependency caused by refraction of light. Accordingly, no chromatic aberration occurs between laser light of colors.

[Deflector]

Next, the deflector will be described in detail.

Figure 3:
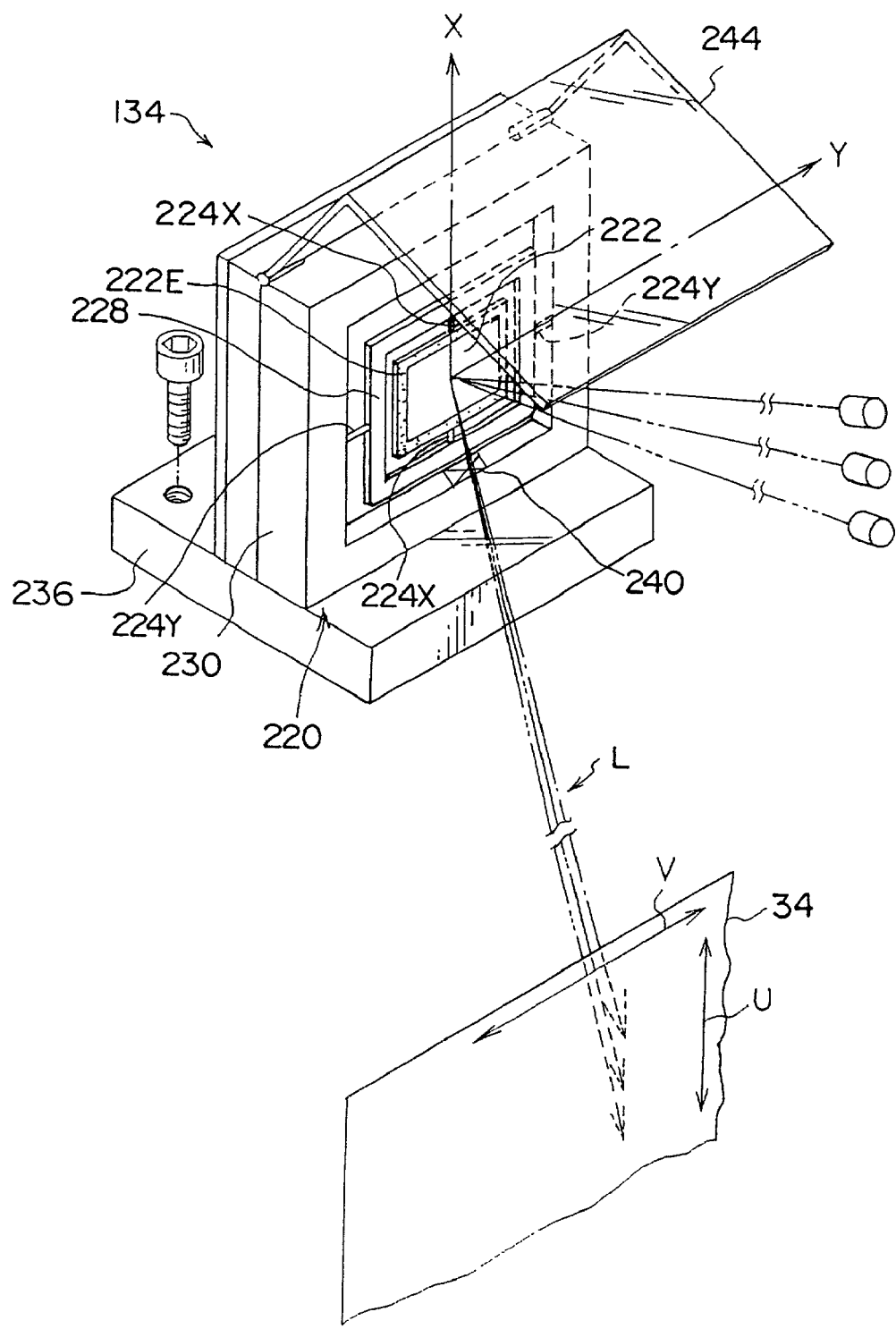
FIG. 3 is a diagram for illustrating a deflector included in the light beam scanning device according to the embodiment of the present invention.
Figure 4:
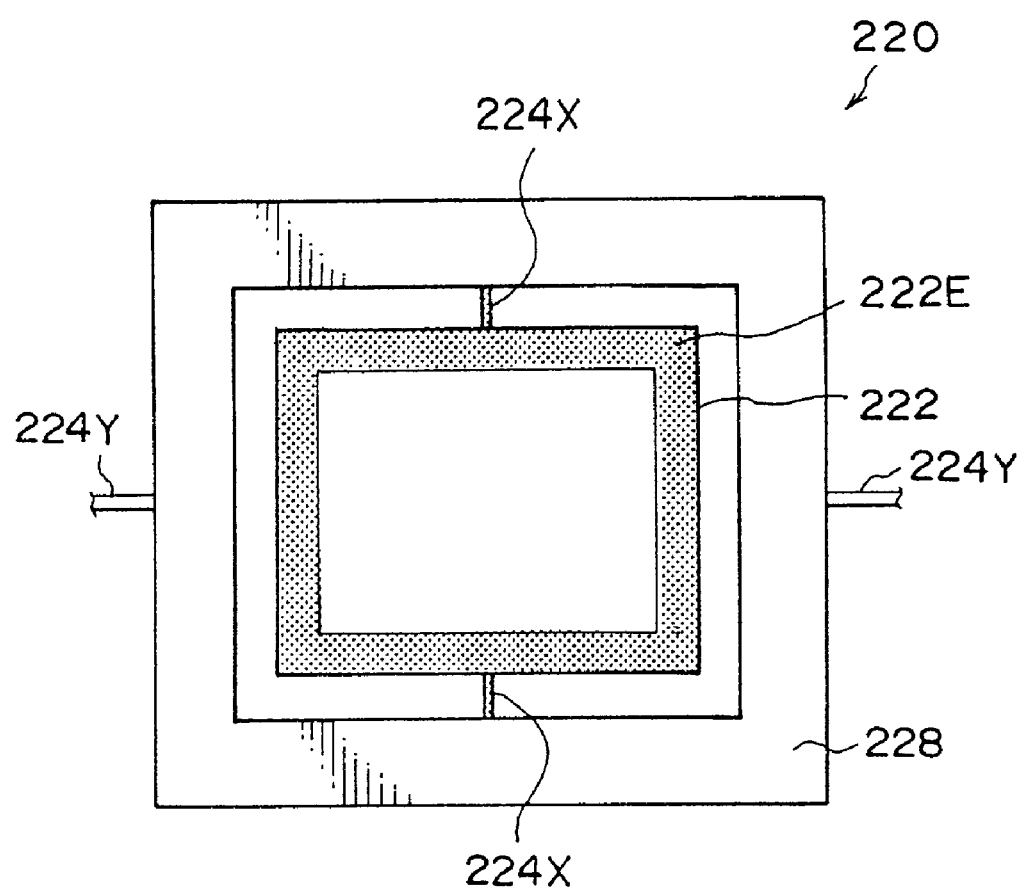
FIG. 4 is a front view showing a deflecting mirror, a frame member and a beam, which form a micro-scanner serving as the deflector included in the light beam scanning device according to the embodiment of the present invention.

As shown in FIG. 3, the deflector 134 has a micro-scanner 220 for two-dimensional scanning with laser light (see FIG. 4). The micro-scanner 220 has recently been put to practical use. In the present embodiment, an example in which laser light is caused to scan in one-dimensional manner is described. The micro-scanner 220 includes a deflecting mirror 222 which reflects scanning light, beams 224X for rotatably holding the deflecting mirror 222 around the x axis, and a frame member 228 at which the beams 224X are fixed.

The deflecting mirror 222 is comprised of a silicon wafer having a flat mirror surface. In order to prevent flare, an antireflection method is given with the peripheral edge 222E of the deflecting mirror 222 and the beams 224X being colored in black.

Further, the micro-scanner 220 also includes beams 224Y for rotatably holding the frame member 228 around y axis, and a base body 230 at which the beams 224Y are fixed. The base body 230 is supported by a mounting table 236 which forms the deflector 134. The base body 230, mounting table 236 and fixing members (for example, a vis) are each made of non-magnetic material. As a result, there is no possibility that the micro-scanner 220 may be broken resulting from a magnet member (not shown) abutting against the micro-scanner 220 due to magnetic attraction.

Electric wiring for supplying electric power to the micro-scanner 220 is disposed in the mounting table 236 through the base body 230. An electric current flows through the peripheral edge of the deflecting mirror 222 via the beams 224X and also flows through the frame member 228 via the beams 224Y. An interaction between a magnetic field generated by the electric current and a magnetic field generated by a permanent magnet 240 provided around the micro-scanner 220 causes Lorentz force, and the deflecting mirror 222X can rotate around the x axis with the beams 224X serving as a shaft, and the frame member 228 can rotate around the y axis with the beams 224Y serving as a shaft.

When the deflecting mirror 222 is rotated around the y axis, a current pulse interval is determined so as to correspond to the resonance frequency of the deflecting mirror 222 and the frame member 228 combined. In order to maintain the resonance frequency at a fixed value, aging (break-in operation) may be carried out before adjustment or the temperature of the deflector 134 may be held at a fixed temperature by temperature control. When the frame member 228 is rotated around the x axis, DC driving current, that is, direct current is made to flow in accordance with (in synchronization with) the conveying of the light and heat sensitive color recording material 34 in the sub-scanning direction. Due to the rotation around the y axis, spot light of laser light is caused to scan the light and heat sensitive color recording material 34 in the main scanning direction U. Due to the rotation around the x axis, laser light is moved on the light and heat sensitive color recording material 34 in the sub-scanning direction V.

As described above, laser light is deflected by using the micro-scanner 220, and therefore, optical face tangle error correction required when laser light is deflected by using a rotating polygon mirror is not necessary. The reason is that a movable portion of the micro-scanner 220 is light in weight and a tilt of the deflecting mirror 222X is extremely small or substantially zero. Therefore, a correction optical system using a cylindrical lens conventionally required by optical face tangle error correction is not required. As a result, the optical system of the light beam scanning device can be simplified and a scanning system can be formed at a low cost.

Further, the movable portion of the micro-scanner 220 is light in weight, and the position of the deflecting mirror 222X can be precisely set. In other words, position setting of the deflecting mirror 222X for a driving signal supplied for position setting can be precisely carried out. As a result, the position of the deflecting mirror 222X can be detected from the supplied signal and also detected by detecting a driving signal as a signal corresponding to detection of a start point or an end point at the time of scanning laser light. Accordingly, the use of the micro-scanner 220 does not require a detector which is necessary when a start point or an end point for scanning laser light is detected. As a result, the optical system can be simplified and a scanning system manufactured at a low cost and having a reduced space can be provided.

The deflector 134 is provided with an opening/closing cover 244 joined by a hinge to the upper end of the base body 230 to cover the deflecting mirror 222. The deflecting mirror 222 is formed of a thin silicon wafer and easily broken. When the cover 244 is provided, the deflecting mirror 222 is prevented from being broken due to operator's carelessness. Further, even when maintenance of the image forming apparatus 10 is carried out, laser light is shut off and the operation is safely carried out. In the micro-scanner, a piezoelectric element may be used as a driving source.

The reflecting surface of the micro-scanner may have an aperture function contributing to the spot diameter of light beam. That is, due to a light beam of luminous flux whose diameter is larger than the reflecting surface of the micro-scanner being made incident on the micro-scanner, the light beam led to the outer periphery of the micro-scanner is reflected. As a result, the light beam diameter is limited and the aperture function can be realized.

Further, the reflecting surface of the micro-scanner or arcsine mirror (described later) preferably has, for example, silver having excellent reflectivity characteristics for each of wavelengths of R, G and B (400 nm to 780 nm) deposited thereon.

In order to lessen the dependence of the arcsine mirror on the angle of incidence, a light beam of polarized light P is preferably made incident on the reflecting surface of the micro-scanner.

The aforementioned reflecting surface may be comprised of a plurality of reflecting surfaces. For example, a reflecting mirror including a single reflecting surface can be rotated or vibrate. However, there are cases in which inertia force may increase in accordance with the size of the reflecting mirror, thereby making drive control difficult. In this case, formation of a reflecting mirror including a plurality of minute reflecting portions facilitates drive control.

[Arcsine Mirror]

In the present embodiment, the arcsine mirror 136 is provided so as to further reflect the light reflected by the aforementioned deflecting mirror 222. When laser light reflected by the deflecting mirror 222 is directly illuminated onto the light and heat sensitive color recording material 34 to generate a main scanning line, the linear speed of laser light, that is, the travel speed of spot light on the light and heat sensitive color recording material 34 in the central region of the scanning range becomes higher than that in end regions of the scanning range (refer to the travel speed line 217 in FIG. 5).

Figure 5:
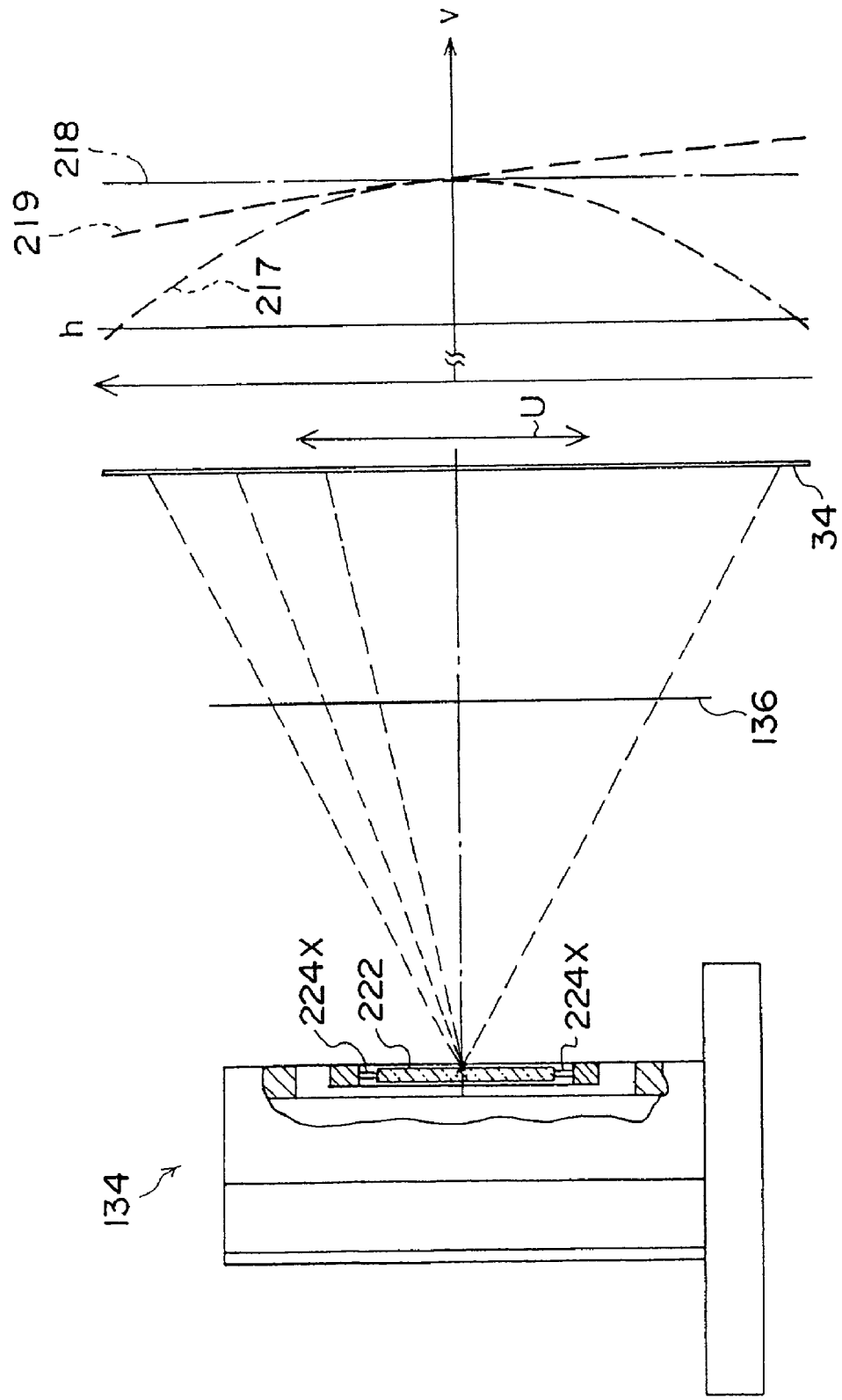
FIG. 5 is a conceptual diagram showing the state in which reflected light is optically corrected by an arcsine mirror in the deflector included in the light beam scanning device according to the embodiment of the present invention, in which a travelling speed (v) of spot light illuminated to a material is indicated by a horizontal axis and a distance (h) in a sub-scanning direction from laser light transmitted through the center of the arcsine mirror on the material is indicated by a vertical axis.

The laser light is reflected by the arcsine mirror 136 and thereby caused to scan the light and heat sensitive color recording material 34 in the main-scanning direction U substantially at a constant speed (refer to the travel speed line 218 in FIG. 5).

If the reflection type scanning optical system including the arcsine mirror 136, and the deflecting mirror 222 does not coincide in phase, a difference is made in the linear speed (see the travel speed line 219 in FIG. 5). Therefore, the base body 230 is rotated so that the difference in the scanning speed between at least two arbitrary points on the main scanning line becomes minimum, and the deflecting mirror 222 is rotated and adjusted together with the frame member 228.

A description will be given of the shape of the arcsine mirror 136 in the reflection type optical system. The present inventors have found the shape of the arcsine mirror 136 which does not need to have wavelength dependency, in which arcsine characteristics, that is, scanning of laser light on the light and heat sensitive color recording material 34 at a constant speed can be easily realized by a simple structure using a general-purpose function or a polynomial.

The following expression (1) is a mathematical expression which specifies the shape of the reflecting surface of the arcsine mirror 136 formed as an aspheric surface. The expression (1) represents the plane of XY polynomial obtained by an XY polynomial and given by adding a tenth order polynomial based on a conic. The expression (1) is used by expanding with xmym. In this case, the relation m+n≦10 is given.

$$z = \frac{cr^2}{1+\sqrt{1-(1+k)c^2r^2}} + \sum_{j=2}^{66} c_j x^m y^n \quad (1)$$

wherein,
z: a sag deflected on a z axis;
c: curvature of vertex (CUY);
k: conic constant
Cj: coefficient of xmym $j=\{(m+n)^2+m+3n\}/2+1$ $r=\sqrt{x^2+y^2}$ \quad (2)

In the plane of XY polynomial, a coefficient for the plane parameter is labeled as xmym, and m and n are power functions of x and y. For example, a coefficient for the term x is labeled as X, a coefficient for the term x2y is labeled as X2Y, and a coefficient for the term x3y6 is labeled as X3Y6. A default value for all coefficients is "0".

The suitable shape of an aspheric surface of the reflecting surface of the arcsine mirror 136 was obtained using the aforementioned expression (1). When the distance between the arcsine mirror 136 and the photosensitive surface is 157.3 mm, the conic constant k is 2.6085, the curvature of vertex (radius) c is 197.70176 mm, the effective size of the arcsine mirror 136 is about 67 mm, the bow is 0.2 mm, the curvature on an image surface, x, is 2.4 and y is 0.9 mm. That is, the arcsine mirror 136 having excellent properties can be obtained.

In the present embodiment, laser light is guided only by the reflection type optical system to the light and heat sensitive color recording material 34. Therefore, no consideration of wavelength dependency is required. Accordingly, the degree of freedom in various optical design increases, and the design can be simplified. As a result, an optical system having a simple structure and a high reliability can be provided.

Further, in the reflection type optical system, the shape of the reflecting portion can be set freely. Therefore, due to laser light being guided only by the reflection type optical system to the light and heat sensitive color recording material 34, the deflective thickness of a reflecting member, particularly, the arcsine mirror 136 can be made smaller. Accordingly, the reflection type optical system can be easily manufactured and the structure thereof can be simplified and further made smaller. Moreover, the arcsine mirror 136 allows light beam reflected by one reflecting surface to easily scan substantially at a constant speed. The arcsine mirror 136 can be formed so that the deflective thickness thereof is made smaller. As a result, the structure of the apparatus can be simplified and further made smaller.

Moreover, a sagittal height (that is, a distance from a tangential plane to a reflecting point) of the reflecting surface of the arcsine mirror 136 is small compared with a reflecting surface having an fθ correcting function in using a rotating polygon mirror. That is, although the sagittal height of the reflecting surface having an fθ correcting function gradually increases from the central portion, the sagittal height of the reflecting surface of the arcsine mirror 136 in the periphery thereof becomes smaller. Accordingly, since the reflecting surface of the arcsine mirror 136 has a small deflective thickness or sagittal height, the precision at the time of manufacturing such as plastics forming of the reflecting surface can be easily maintained and the reflecting surface can be easily manufactured. Further, the structure of the apparatus can be further simplified and a small-size apparatus can be provided.

When the reflection type optical system including the arcsine mirror 136 and a mirror scanning system, that is, the micro-scanner 220 are used together, optical face tangle error correction required when a polygon mirror is used is not necessary. Since the micro-scanner 220 is used, an element for a multi-wavelength optical comprised of a single (one) reflecting surface can be provided, and the structure of the apparatus can be simplified and further made smaller. The arcsine mirror 136, even when comprised of a single (one) reflecting surface, has no wavelength dependency, and therefore, it can be defined by simply using a general-purpose function and a polynomial, and arcsine characteristics, that is, scanning of laser light on an exposure medium at a constant speed can be easily realized. As a result, various optical designs are also simplified and the structure of an optical system can also be simplified. Further, die forming or forming inspection of the reflecting mirror can be simplified, and the apparatus can be manufactured at a low cost. Moreover, because a single arcsine mirror 136 is used, a small-size apparatus can be realized.

[Control Section]

Next, a description will be given of the control section 18 including the modulation circuit 19. First, modulation of a semiconductor laser in the present embodiment will be described.

As driving (that is, modulation) of a semiconductor laser, typically, direct modulation and indirect modulation are employed. The direct modulation includes modulation of pulse width in which an on/off control signal of a semiconductor laser is modulated by a pulse width, and intensity modulation in which an on/off control signal of a semiconductor laser is modulated by intensity. The indirect modulation includes external modulation in which laser light emitted from a semiconductor laser is modulated by an external element. The external element mentioned herein includes an element obtained by electro-optic effect (EOM) and an element obtained by an acousto-optic effect (AOM).

In order to drive (modulate) a semiconductor laser, it is more preferable to employ the direct modulation for controlling only the control signal than employ the indirect modulation, that is, external modulation in which a modulation element needs to be provided outside in consideration of the size of a modulation element or complexity of a driving device (circuit). Among the direct modulation, modulation of pulse width is more preferable than intensity modulation from the standpoint of simplified control or an expedient structure of the circuit. That is, the intensity modulation is more advantageous than the external modulation and the modulation of pulse width is further advantageous compared with the intensity modulation. Accordingly, when a plurality of semiconductor lasers are used as in the present embodiment, it is preferable that all of the lasers is modulated by using the modulation of pulse width.

On the other hand, the properties required by a semiconductor laser become severe. That is, higher properties are required in the order of the modulation of pulse width, the intensity modulation, and the external modulation. Accordingly, there are cases in which the properties of a semiconductor laser may not coincide with a modulation system of the semiconductor laser depending on a semiconductor to be used. The wavelength of a semiconductor laser has been made shorter in recent years. However, the properties of a short-wave semiconductor laser are deteriorated compared with those of a long-wave semiconductor laser in many cases. Further, there is a possibility that the properties of a semiconductor laser having a specified oscillation wavelength may not be obtained.

Accordingly, in the present embodiment, modulation corresponding to each semiconductor laser is employed. That is, three laser light sources of three colors (a red-light laser light source 100, a green-light laser light source 102 and a blue-light laser light source 104) are used as the light source section 106.

The present inventors have recognized that, preferably, the modulation of pulse width is employed in the red-light laser light source 100, the intensity modulation is employed in the blue-light laser light source 104, and the external modulation is employed in the green-light laser light source 102 having a resonant SHG. Further, heretofore, an external modulator has been used for lasers in an overall range of wavelength, and an expensive and large-size apparatus was required accordingly. In the present embodiment, the present inventors have recognized that the direct modulation is employed in the red-light laser light source 100 and the blue-light laser light source 104, and the external modulation is employed in the green-light laser light source 102, thereby resulting in an inexpensive and small-size apparatus being realized.

In the control section 18 of the present embodiment, a different modulation system is employed to correspond to each of the laser light sources in the light source section 106.

Figure 6:
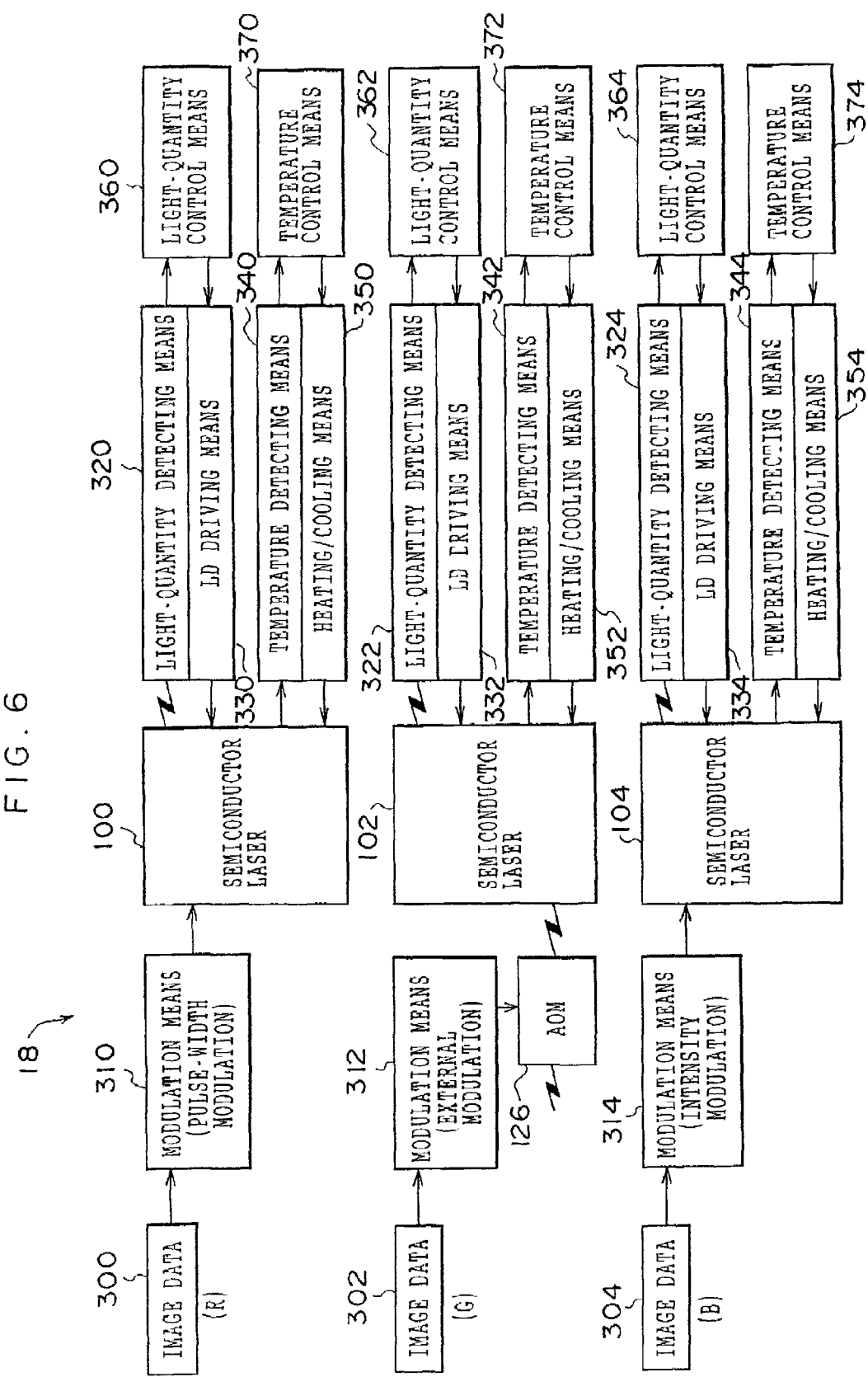
FIG. 6 is a block diagram which schematically shows the structure of a control section according to the embodiment of the present invention.

As shown in FIG. 6, the control section 18 includes image data memory 300, 302 and 304. That is, although not illustrated, the control section 18 is comprised of a microcomputer, and includes, as memory in which image data for recording an image on the light and heat sensitive color recording material 34 is stored, image data memory 300, 302 and 304. The image data memory 300 is a memory in which image data of R is stored. The image data memory 302 is a memory in which image data of G is stored, and the image data memory 304 is a memory in which image data of B is stored.

The image data memory 300 is connected to a modulation means 310 used for the red-light laser light source 100. The modulation means 310 is formed by a circuit for modulation of pulse width. The output end of the modulation means 310 is connected to the red-light laser light source 100. Accordingly, image data of R is read out from the image data memory 300 and the red-light laser light source 100 is directly modulated by a pulse-width modulating signal from the modulation means 310.

The image data memory 302 is connected to a modulation means 312 used for the green-light laser light source 102. The modulation means 312 is formed by a circuit for external modulation. The output end of the modulation means 312 is connected to the external modulator 126. Accordingly, image data of G is read out from the image data memory 302 and the external modulator 126 is driven by a modulating signal for the external modulator 126 from the modulation means 312, and laser light from the green-light laser light source 102 made incident on the external modulator 126 is indirectly modulated and emitted.

The image data memory 304 is connected to a modulation means 314 used for the blue-light laser light source 104 in the same manner as in the red-light laser light source. The modulation means 314 is formed by a circuit for modulation of pulse width, and the output end of the modulation means 314 is connected to the blue-light laser light source 104. Accordingly, image data of B is read out form the image data memory 304 and the blue-light laser light source 104 is directly modulated by a pulse-width modulating signal from the modulation means 314.

As described above, in the present embodiment, a modulation system is selected independently for each laser light source based on the properties of the device itself. Therefore, the properties of laser light to be obtained are improved. Accordingly, an image of high image quality can be formed. Since the modulation system can be selected independently for each laser light source based on the properties of the device itself, even when a laser light source which is difficult to handle is used, an image of higher image quality can be formed simply.

Further, a modulation system is selected for each of laser light sources depending on the characteristics thereof. Therefore, the apparatus can be made smaller. In other words, when a modulation system is set so as to correspond to each laser light source, restrictions on the arrangement of laser light sources are reduced, and the space therefor can be easily maintained. As a result, the apparatus can be made smaller and the simple structure thereof allows low-cost manufacturing.

On the other hand, the semiconductor laser is greatly affected by a variation in the quantity of light with the passage of time or a variation in the quantity of light caused by a change of environmental temperature. For this reason, the control section 18 includes light-quantity control means 360, 362 and 364, and temperature control means 370, 372 and 374.

The light-quantity control means 360 is provided for the red-light laser light source 100 and connected to a light-quantity detecting means 320 and also to an LD driving means 330. The light-quantity detecting means 320 is used to detect the quantity of light emitted from the red-light laser light source 100. The detected value is inputted to the light-quantity detecting means 360 and the light-quantity detecting means 360 outputs a control signal to the LD driving means 330 to allow the LD driving means 330 to drive the red-light laser light source 100 (for example, the quantity of light emitted therefrom becomes a fixed value). In FIG. 6, driving of the laser light source 100 by the LD driving means 330, and modulation thereof by the modulation means 310 are separately shown, but the laser light source 100 can be driven by synthesizing into one control signal on the circuit structure.

Further, the temperature control means 370 is provided for the red-light laser light source 100 and connected to a temperature detecting means 340 and also to a heating/cooling means 350. The temperature detecting means 340 is used to detect the temperature of the red-light laser light source 100. The detected value is inputted to the temperature control means 370 and the temperature control means 370 outputs a control signal to the heating/cooling means 350. As a result, the heating/cooling means 350 adjusts the temperature of the red-light laser light source 100 (for example, at a fixed temperature).

Likewise, the light-quantity control means 362 is provided for the green-light laser light source 102 and connected to a light-quantity detecting means 322 and also to an LD driving means 332. Based on the quantity of light emitted from the green-light laser light source 102 detected by the light-quantity detecting means 322 (that is, a detected value), the light-quantity detecting means 362 controls the LD driving means 332 and the green-light laser light source 102 is driven (for example, the quantity of light emitted therefrom becomes fixed). Further, the temperature control means 372 is provided for the green-light laser light source 102 and connected to a temperature detecting means 342 and also to a heating/cooling means 352. Based on the temperature of the green-light laser light source 102 detected by the temperature detecting means 342 (that is, a detected value), the temperature control means 372 controls the heating/cooling means 352 to adjust the temperature of the green-light laser light source 102 (for example, at a fixed temperature).

Further, the light-quantity control means 364 is provided for the blue-light laser light source 104 and connected to a light-quantity detecting means 324 and also to an LD driving means 334. Based on the quantity of light emitted from the blue-light laser light source 104 detected by the light-quantity detecting means 324 (that is, a detected value), the light-quantity detecting means 364 controls the LD driving means 334 to drive the blue-light laser light source 104 (for example, the quantity of light emitted therefrom becomes fixed). The temperature control means 374 is provided for the blue-light laser light source 104 and connected to a temperature detecting means 344 and also to a heating/cooling means 354. Based on the temperature of the blue-light laser light source 104 detected by the temperature detecting means 344 (that is, a detected value), the temperature control means 374 controls the heating/cooling means 354 to adjust the temperature of the blue-light laser light source 104 (for example, at a fixed temperature).

In the present embodiment, the quantity of light and the temperature are adjusted for each of laser light sources of different colors as described above, and therefore, stable laser light can be obtained uniformly for each of the laser light sources.

The properties of a recording material can be brought out to the maximum only by selecting a laser light source of a wavelength suitable for each of recording materials having different spectral sensitivities.

Further, an operating portion such as a micro-scanner is extremely light in weight. Therefore, it can be mounted to the apparatus at an arbitrary position, thereby allowing a free layout of apparatus.

In the present embodiment, a case in which the semiconductor laser is used as the light source was described, but the present invention is not limited to the same. Other laser devices such as a gas laser and a solid state laser may be used.

[Light and Heat Sensitive Recording Material]

Next, a description will be given of a light and heat sensitive recording material used for image recording in the image recording apparatus of the present invention. The light and heat sensitive recording material used by the present invention includes a light and heat sensitive recording layer (an image recording layer) on a support. The light and heat sensitive recording layer is exposed to light to form a latent image thereon, and the latent image is developed by heating and an image is formed. Further, in the light and heat sensitive recording material used by the present invention, in addition to the light and heat sensitive recording layer, other known layers, for example, a protective layer, an intermediate layer, and a UV absorption layer each may be formed at any position. Moreover, the light and heat sensitive recording material used by the present invention which includes, on the support, at least three light and heat sensitive recording layers containing a yellow coloring component, a magenta coloring component and a cyan coloring component, respectively, can be used as a light and heat sensitive color recording material in formation of a color image. In addition, if necessary, a light and heat sensitive recording layer containing a black coloring component may also be provided.

In the present invention, a light and heat sensitive recording material can be suitably used, which includes: (a) a light and heat sensitive recording layer containing a thermally responsive micro-capsule which envelops a color forming component A, and also containing, outside the micro-capsule, a photo-polymeric composition which is constituted of at least a substantially colorless compound B having, in the same molecule, a polymeric group and a site which reacts on the color forming component A to form a color, and a photopolymerization initiator; (b) a light and heat sensitive recording layer containing a thermally responsive micro-capsule which envelops a color forming component A, and also containing, outside the micro-capsule, a photo-polymeric composition which is constituted of at least a substantially colorless compound C which reacts on the color forming component A to form a color, a photo-polymeric compound D, and a photopolymerization initiator; (c) a light and heat sensitive recording layer containing a thermally responsive micro-capsule which envelops a color forming component A, and also containing, outside the micro-capsule, a photo-polymeric composition comprised of at least a substantially colorless compound C which reacts on the color forming component A to form a color, a photo-polymeric compound Dp having a site which restrains reaction between the color forming component A and the compound C, and a photopolymerization initiator; and (d) a light and heat sensitive recording layer containing a thermally responsive micro-capsule which envelops a substantially colorless compound C which reacts on the color forming component A to form a color, and also containing, outside the micro-capsule, a photo-polymeric composition which is constituted of at least the color forming component A, a photo-polymeric compound D, and a photopolymerization initiator.

The aforementioned light and heat sensitive recording layer (a) is exposed to light desired imagewise, and the photo-polymeric composition located outside the micro-capsule causes a polymerization reaction by a radical generated from the photopolymerization initiator and hardened, and a latent image of desired imagewise is formed. Subsequently, the compound B existing in an unexposed region moves in the recording material by being heated, and reacts on the color forming component A in the capsule to form a color. Accordingly, the aforementioned light and heat sensitive recording layer (a) is a positive type light and heat sensitive recording layer in which no color is formed in an exposed region and an unexposed and non-hardened region causes color formation to form an image. An example thereof is specifically a light and heat sensitive recording layer disclosed in Japanese Patent Application Laid-Open (JP-A) No. 3-87827, which contains, outside a micro-capsule, a compound having an electron-accepting group and a polymeric group in the same molecule, a photo-setting composition having a photopolymerization initiator, and an electron-donating colorless dye encapsulated in the micro-capsule. In the light and heat sensitive recording layer thus formed, the photo-setting composition outside the micro-capsule is polymerized by exposure and hardened, thereby forming an image thereon. Thereafter, the electron-accepting compound existing in the unexposed region moves in the recording material by being heated, and reacts on the electron-donating colorless dye in the micro-capsule to form a color. Accordingly, a hardened latent image portion in the exposed region does not form an color, and only a non-hardened portion forms a color. As a result, a high-contrast and sharp positive image can be formed.

The aforementioned light and heat sensitive recording layer (b) is exposed to light desired imagewise, and the photo-polymeric compound D is polymerized by a radial generated from the photopolymerization initiator reacting upon exposure and a film thereof is hardened, thereby allowing a latent image to be formed desired imagewise. The photo-polymeric compound D does not have a site which restrains a reaction between the color forming component A and the compound B. Therefore, the compound C existing in the unexposed region moves in the recording material by being heated, and reacts on the color forming component A in the capsule and forms a color. Accordingly, the light and heat sensitive recording layer (b) is a positive type light and heat sensitive recording layer in which no color is formed in an exposed region and the unexposed and non-hardened region causes color formation to form an image. An example thereof is specifically a light and heat sensitive recording layer containing an azomethine dye precursor, a deprotective agent for producing an azomethine dye from the dye precursor, a photo-polymeric compound, and a photopolymerization initiator. In the light and heat sensitive recording layer thus formed, a photo-polymeric compound located outside the micro-capsule is photopolymerized by exposure and hardened, thereby forming a latent image thereon. Thereafter, the deprotective agent existing in the unexposed region moves in the recording material by being heated, and reacts on the azomethine dye precursor in the micro-capsule to form a color. Accordingly, no color is formed in a latent image portion hardened in the exposed region, and a color is formed only in a non-hardened portion, thereby allowing a positive image to be formed on the recording layer.

The aforementioned light and heat sensitive recording layer (c) is exposed desired imagewise, and a photo-polymeric compound Dp is polymerized by a radical generated from a photopolymerization initiator reacting upon exposure and a film thereof is hardened, thereby forming a latent image desired imagewise. The photo-polymeric compound Dp has a site which restrains a reaction between the color forming component A and the compound C. Therefore, the compound C moves depending on the film property of a latent image (that is, a hardened portion) formed by exposure, and reacts on the color forming component A in the capsule to form an image. Accordingly, the light and heat sensitive recording layer (c) is a negative type light and heat sensitive recording layer in which an exposed portion forms a color to form an image. An example thereof is specifically a light and heat sensitive recording layer disclosed in JP-A No. 4-211252, which contains, outside the micro-capsule, an electron-accepting compound, a polymeric vinyl monomer, a photopolymerization initiator, and an electron-donating colorless dye encapsulated in the micro-capsule. The mechanism for forming an image on the light and heat sensitive recording layer is not clear. A vinyl monomer existing outside the micro-capsule is polymerized by exposure, and the electron-accepting compound coexisting in the exposed region is not at all incorporated in the formed polymer. An interaction between the electron-accepting compound and the vinyl monomer is lowered, and the compound exists so as to be capable of moving at a high diffusion speed. The electron-accepting compound in the unexposed region exists in the state of being trapped by the vinyl monomer coexisting therewith. Therefore, when heated, the electron-accepting compound in the exposed region preferentially moves in the recording material and reacts on the electron-donating colorless dye in the micro-capsule. However, the electron-accepting compound in the unexposed region is not transmitted through a wall of the capsule even if heated, and does not react on the electron-donating colorless dye. Therefore, it is considered that the compound does not contribute to formation of color. Accordingly, in the light and heat sensitive recording layer thus formed, an image is formed in such a manner that a color is formed in the exposed region and no color is formed in the unexposed region, thereby allowing a high-contrast and sharp negative image to be formed on the layer.

The aforementioned light and heat sensitive recording layer (d) is exposed to light desired imagewise, and the photo-polymeric compound D is polymerized by a radical generated from the photopolymerization initiator reacting upon exposure and a film thereof is hardened, thereby forming an image desired imagewise. The photo-polymeric compound D does not have a site which restrains a reaction between the color forming component A and the compound C. Therefore, the color forming compound A existing in an unexposed region moves in the recording material by being heated, and reacts on the compound C in the capsule to form a color. Accordingly, the light and heat sensitive recording layer (d) is a positive type light and heat sensitive recording layer in which an image is formed in such a manner that no color is formed in the exposed region and a color is formed in the unexposed and non-hardened region.

Next, a description will be given of structural components which constitute the aforementioned light and heat sensitive recording layers (a) to (d).

As the color forming component A in the light and heat sensitive recording layers (a) to (d), a substantially colorless electron-donating colorless dye or diazonium salt compound is used. Examples of the electron-donating colorless dye include electron-donating colorless dyes disclosed in Japanese Patent Application No. 11-36308. Examples of the diazonium salt compound include compounds disclosed in Japanese Patent Application No. 11-36308.

As the substantially colorless compound B used in the light and heat sensitive recording layer (a) and having, in the same molecule, a polymeric group and a site which reacts on the color forming component A to form a color, any compound can be used which has functions of forming a color by reacting on the color forming component A such as the electron-accepting compound having a polymeric group or a coupler compound having a polymeric group, and polymerizing by reacting on light so as to be hardened. As the electron-accepting compound having a polymeric group, that is, a compound having an electron-accepting group and a polymeric group in the same molecule, any compound can be used which has a polymeric group and reacts on the electron-donating colorless dye which is one of the color forming component A to form a color, and photo-polymerized to form a hardened film. Examples of the electron-accepting compound having a polymeric group include compounds disclosed in Japanese Patent Application No. 11-36308. Further, examples of the coupler compound having a polymeric group include compounds disclosed in Japanese Patent Application No. 11-36308.

Further, in the light and heat sensitive recording layers (b) to (d), as the compound which reacts on the color forming component A to form a color, the substantially colorless compound C having no polymeric group and reacting on the color forming component A to form a color is used in place of the compound B having a polymeric group. However, the compound C has no polymeric group. It is necessary that a film hardening action caused by photopolymerization is given to the recording layer, and therefore, a photo-polymeric compound D having a polymeric group is used together. As the aforementioned compound C, any electron-accepting compound or coupler compound having no polymeric group can be used. Examples of the electron-accepting compound having no polymeric group include compounds disclosed in Japanese Patent Application No. 11-36308. Examples of the coupler compound having no polymeric group include compounds disclosed in Japanese Patent Application No. 11-36308.

As the photo-polymeric compound D, a photo-polymeric monomer can be used. In this case, a photo-polymeric monomer having at least one vinyl group in a molecule can be used. Further, when a negative image is obtained, a photo-polymeric compound Dp having a site which restrains a reaction between the color forming component A and the compound C is used. As the photo-polymeric compound Dp, a photo-polymeric compound Dp depending on the aforementioned compound C to be used, that is, specific photo-polymeric monomers (Dp1, Dp2) are selectively used. When an electron-accepting compound having no polymeric group is used, the specific photo-polymeric monomer Dp1 is used. The photo-polymeric monomer Dp1 is preferably a photo-polymeric monomer having the function of restraining a reaction between the electron-donating colorless dye and the electron-accepting compound and having at least one vinyl group in the molecule. Examples of the photo-polymeric monomer Dp1 include photo-polymeric monomers disclosed in Japanese Patent Application No. 11-36308. When a coupler compound having no polymeric group is used, the specific photo-polymeric monomer Dp2 is used together. The photo-polymeric monomer Dp2 is preferably a photo-polymeric monomer which includes an acid group having an effect of restraining a coupling reaction and which is not a metallic salt compound. Examples of the photo-polymeric monomer Dp2 include photo-polymeric monomers disclosed in Japanese Patent Application No. 11-36808.

Further, in the light and heat sensitive recording layers (b) to (d), an azomethine dye precursor is used as the color forming component A and a deprotective agent which produces (forms) an azomethine dye due to coming into contact with the azomethine dye precursor can be used as the compound C. Due to the photo-polymeric compound (Dp) having a site which restrains a reaction between the azomethine dye precursor and the deprotective agent being used, a negative image can be obtained. Examples of the azomethine dye precursor include azomethine dye precursors disclosed in Japanese Patent Application No. 2000-18425. Examples of the deprotective agent include those disclosed in the same application. In the light and heat sensitive recording layer (a), an azomethine dye precursor can be used as the color forming component A and a deprotective agent having a polymeric group can be used as the compound B. Examples of the deprotective agent having a polymeric group include those disclosed in Japanese Patent Application No. 2000-18425.

Other examples of combination between the color forming component A and the compound B or C which reacts on the color forming component A to form a color include the following combinations (1) to (15). Compounds in each combination as below are shown in the order of the color forming component A and the compound B or C.

(1) a combination of organic acid metallic salt such as silver behenate or silver stearate, and a reducing agent such as protocatechuic acid, spiroindan, or hydroquinone (2) a combination of long-chain fatty acid iron salt such as ferric stearate or ferric myristate, and phenols such as tannic acid, gallic acid, or ammonium salicylate (3) a combination of organic acid heavy metallic acid, for example, nickel such as acetic acid, stearic acid or palmitic acid, cobalt, lead, copper, iron, mercury or silver salt, and alkaline earth metal sulfide such as calcium sulfide, strontium sulfide or potassium sulfide, or a combination of the aforementioned organic acid heavy metallic salt, and an organic chelating agent such as s-diphenylcarbazide or diphenylcarbazone (4) a combination of heavy metal sulfate such as silver, lead, mercury or sodium, and a sulfur compound such as sodium tetrathionate, sodium thiosulfate or thiourea (5) a combination of fatty-acid ferric salt such as ferric sterate, and an aromatic polyhydroxy compound such as 3,4-hydroxytetraphenylmethane (6) a combination of organometallic salt such as oxalate or mercury oxalate, and an organic polyhydroxy compound such as polyhydroxy alcohol, glycerine or glycol (7) a combination of fatty-acid ferric salt such as ferric pelargonic acid or ferric lauric acid, and a thiocecylcarbamide or isothiocecylcarbamide derivatitve (8) a combination of organic acid lead salt such as lead capronate, lead pelargonate or lead behenate, and a thiourea derivative such as ethylenethiourea or N-dodecylthiourea (9) a combination of higher fatty acid heavy metallic salt such as ferric stearate or copper stearate, and zinc dialkyldithiocarbamine

(10) a combination of resorcinol and a nitroso compound to form an oxazine dye

(11) a combination of a formazan compound and a reducing agent and/or metallic salt
(12) a combination of an oxidation color forming agent and an oxidizer
(13) a combination of phthalonitriles and diiminoisoindolines (a combination generated by phthalocyanine)
(14) a combination of isocyanates and diiminoisoindolines (a combination generated by a colored pigment)
(15) a combination of pigment precursor and an acid or a base (a combination generated by a pigment)

Among the aforementioned combinations of color forming components, the combination of an electron-donating dye precursor and an electron-accepting compound, the combination of a diazo compound and a coupler compound, the combination of a protected dye precursor and a deprotective agent, and the combination of an oxidant precursor of paraphenylenediamine derivative or para-aminophenol derivative, and a coupler compound are preferable. That is, as the color forming component A, electron-donating dye precursor, diazo compound, protected dye precursor, or oxidant precursor is preferable. As the compound B or compound C, electron-accepting compound, coupler compound or deprotective agent is preferable.

Next, a description will be given of the photopolymerization initiator used in the light and heat sensitive recording layers (a) to (d). The photopolymerization initiator is used in any of the light and heat sensitive recording layers (a) to (d) and exposed to light to generate a radical. As a result, a polymerization reaction is caused in the recording layer and can be accelerated. The polymerization reaction allows the film of the recording layer to be hardened, and a latent image can be formed desired imagewise. The aforementioned photopolymerization initiator preferably contains a spectral sensitization compound having the maximum absorption wavelength in the range of 300 to 1000 nm, and a compound which interacts with the spectral sensitization compound. However, so long as the compound which interacts with the spectral sensitization compound is a compound which functions both as a dye portion having the maximum absorption wavelength of 300 to 1000 nm and as a borate portion in the structure thereof, the aforementioned spectral sensitization dye may not be used. When a color image is formed, a light and heat sensitive recording material having a light and heat sensitive recording layer including the photopolymerization initiator containing such compounds is suitably used. Examples of the photopolymerization initiator include photopolymerization monomers disclosed in Japanese Patent Application No. 11-36308.

In the aforementioned light and heat sensitive recording material, other additives of the light and heat sensitive recording layer, the structure of other layers than the light and heat sensitive recording layer, and a micro-capsulation method may be those disclosed in Japanese Patent Application No. 11-36308.

Further, in the present invention, in addition to the light and heat sensitive recording material having the aforementioned light and heat sensitive recording layers (a) to (d), a light and heat sensitive recording material can be suitably used which has: (e) a light and heat sensitive recording layer containing an oxidant precursor E encapsulated in a thermally responsive micro-capsule, an activator G located outside the thermally responsive micro-capsule and reacting on the oxidant precursor E to produce an oxidant F, and a dye forming coupler H which conducts a coupling reaction with the oxidant F to form a dye, which light and heat sensitive recording layer has photo-hardening properties with a portion thereof irradiated with light being hardened due to irradiation of light; and (f) a light and heat sensitive recording layer containing an oxidant precursor E located outside the thermally responsive micro-capsule, an activator G which reacts on the oxidant precursor E encapsulated in the micro-capsule to produce an oxidant F, and a dye forming coupler H which conducts a coupling reaction with the oxidant F to form a dye, which light and heat sensitive recording layer has photo-hardening properties with a portion thereof irradiated with light being hardened due to irradiation of light.

In the aforementioned light and heat sensitive recording layer (e), a portion to be irradiated with light is hardened by being exposed desired imagewise, and a latent image of desired imagewise is formed. Subsequently, the activator G existing in an unexposed region moves in the recording material by being heated, and reacts on the oxidant precursor E in the capsule to produce the oxidant F. The produced oxidant F conducts a coupling reaction with the dye forming coupler H to form a dye (form a color). Accordingly, the light and heat sensitive recording layer (e) is a positive type light and heat sensitive recording layer in which an image is formed in such a manner that no color is formed in an exposed portion and a color is formed in an unexposed and non-hardened region. For example, a light and heat sensitive recording layer disclosed in Japanese Patent Application No. 11-324548 is used, which contains an oxidant precursor of para-phenylenediamine derivative or para-aminophenyl derivative encapsulated in a micro-capsule, and a dye forming coupler, an activator located outside the micro-capsule and reacting on the oxidant precursor to produce an oxidant of para-phenylenediamine derivative or para-amino phenol derivative, a photo-polymeric monomer, and a photopolymerization initiator. In this light and heat sensitive recording layer, the photo-polymeric monomer is polymerized by exposure and hardened, and a latent image is formed on the recording layer. Thereafter, the activator existing in an unexposed region moves in the recording material by being heated, and reacts on the oxidant precursor of para-phenylenediamine derivative or para-aminophenol derivative in the micro-capsule to produce the oxidant of para-phenylenediamine derivative or para-aminophenyl derivative, which is a color-forming developing agent, in the micro-capsule. The oxidant of the color-forming developing agent further reacts on the dye forming coupler in the micro-capsule to form a color. Accordingly, a latent image portion hardened in the exposed region does not form a color, and a color is formed only in a non-hardened region. As a result, a high-contrast and sharp positive image can be formed.

In the aforementioned light and heat sensitive recording layer (f), a portion to be irradiated with light is hardened by being exposed desired imagewise, and a latent image of desired imagewise is formed. Subsequently, the oxidant precursor E existing in an unexposed region moves in the recording material by being heated, and reacts on the activator G in the capsule to produce an oxidant F. The produced oxidant F conducts a coupling reaction with the dye forming coupler H to form an dye (form a color). Accordingly, the light and heat sensitive recording layer (f) is a positive type light and heat sensitive recording layer in which an image is formed in such a manner that no color is formed in the exposed region and a color is formed in a non-hardened portion of the unexposed region. For example, a light and heat sensitive recording layer disclosed in Japanese Patent Application No. 11-324548 is used which contains an oxidant precursor of para-phenylenediamine derivative or para-aminophenol derivative located outside the micro-capsule, an activator and a dye forming coupler, which reacts on the oxidant precursor encapsulated in the micro-capsule to produce an oxidant of para-phenylenediamine derivative or para-aminophenol derivative, a photo-polymeric monomer, and a photopolymerization initiator. In this light and heat sensitive recording layer, the photo-polymeric monomer is polymerized by exposure and hardened, and a latent image is formed on the recording layer. Thereafter, the oxidant precursor of para-phenylenediamine derivative or para-aminophenol derivative existing in an unexposed region moves in the recording material by being heated and reacts on the activator in the micro-capsule to produce an oxidant of para-phenylenediamine derivative or para-aminophenol derivative, which is a color-forming developing agent, in the micro-capsule. The oxidant of the color-forming developing agent further reacts on the dye forming coupler in the micro-capsule to form a color. Accordingly, no color is formed in a latent image portion hardened in the exposed region, and a color is formed only in the non-hardened region. As a result, a high-contrast and sharp positive image can be formed.

Next, a description will be given of structural components which constitute the aforementioned light and heat sensitive recording layers (e) and (f). The oxidant F produced in the light and heat sensitive recording layers (e) and (f) is an oxidant of a color-forming developing agent. Examples of the oxidant precursor E include compounds disclosed in Japanese Patent Application No. 11-324548. Examples of the activator G include compounds disclosed in the same application. Further, examples of the dye forming coupler H include compounds disclosed in the same application.

Due to the photo-polymeric compound D and the photo-polymerization initiator being added to the light and heat sensitive recording layers (e) and (f) in the same manner as in the light and heat sensitive recording layers (b) to (d), photo-hardened light and heat sensitive recording layers can be formed. Further, due to one of the oxidant precursor E, activator G and dye forming coupler H having a polymeric group, a photo-hardened light and heat sensitive recording layer can be formed. Further, a negative image can be obtained by using, as the photo-polymeric compound, a photo-polymeric compound Dp having a great interaction with one of the oxidant F and the dye forming coupler H. The photo-polymeric compound D and the photopolymerization initiator may be the same as those used in the light and heat sensitive recording layers (b) to (d).

Further, in the light and heat sensitive recording layers (e) and (f) as well, other additives of the light and heat sensitive recording layer, the structure of other layers than the light and heat sensitive recording layer, and a micro-capsulation method may be those disclosed in Japanese Patent Application No. 11-36308 in the same manner as in the aforementioned light and heat sensitive recording layers (a) to (d).

A description will be given hereinafter of a second embodiment of the present invention. Note that the same members as those of the first embodiment will be denoted by the same reference numerals, and a description thereof will be omitted.

Figure 7:
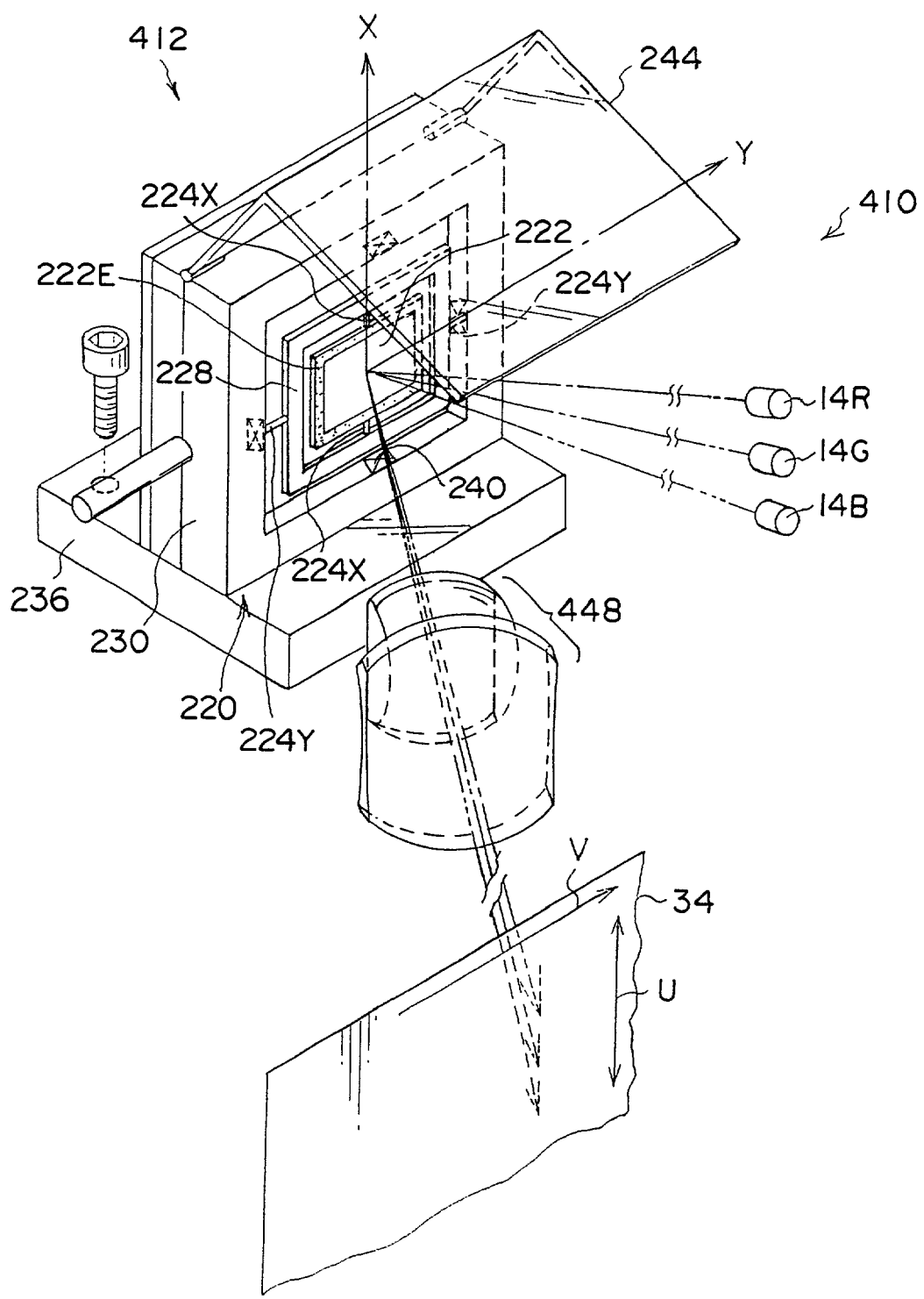
FIG. 7 is a perspective view showing the state in which laser light is caused to scan in a two-dimensional manner in an image recording apparatus according to a second embodiment of the present invention.

As shown in FIG. 7, an image recording apparatus (a light beam scanning apparatus) 410 according to the second embodiment is provided with a deflector 412 which allows scanning of laser light in a two-dimensional manner, and laser devices (laser light sources) 14R, 14G and 14B which emit laser light corresponding to three primary colors of R, G and B. The laser light mentioned herein may be visible light, ultraviolet light or infrared light.

Due to the laser light emitted from the laser devices 14R, 14G and 14B being scanned by the deflector 412 in the two-dimensional manner, an image is recorded on the recording material (a heat sensitive color recording material) 34.

[Deflector]

The deflector 412 has a micro-scanner 220 for two-dimensional scanning with laser light (see also FIG. 4). The micro-scanner 220 has been put into practical use in recent years.

[Arcsine Lens]

The image recording apparatus 410 is provided with an arcsine lens 448 through which light reflected by a deflecting mirror 222 is transmitted.

When the deflecting mirror 222 is rotated around the y axis, it oscillates in a sinusoidal waveform. For this reason, if the reflected laser light is made to scan to generate main scanning lines on the recording material 34 using a common spherical lens, the linear speed of laser light, that is, the travel speed of spot light on the recording material 34 in the edge region of the scanning range becomes slower than that in the central region (see the travel speed line 217 in FIG. 8).

Figure 8:
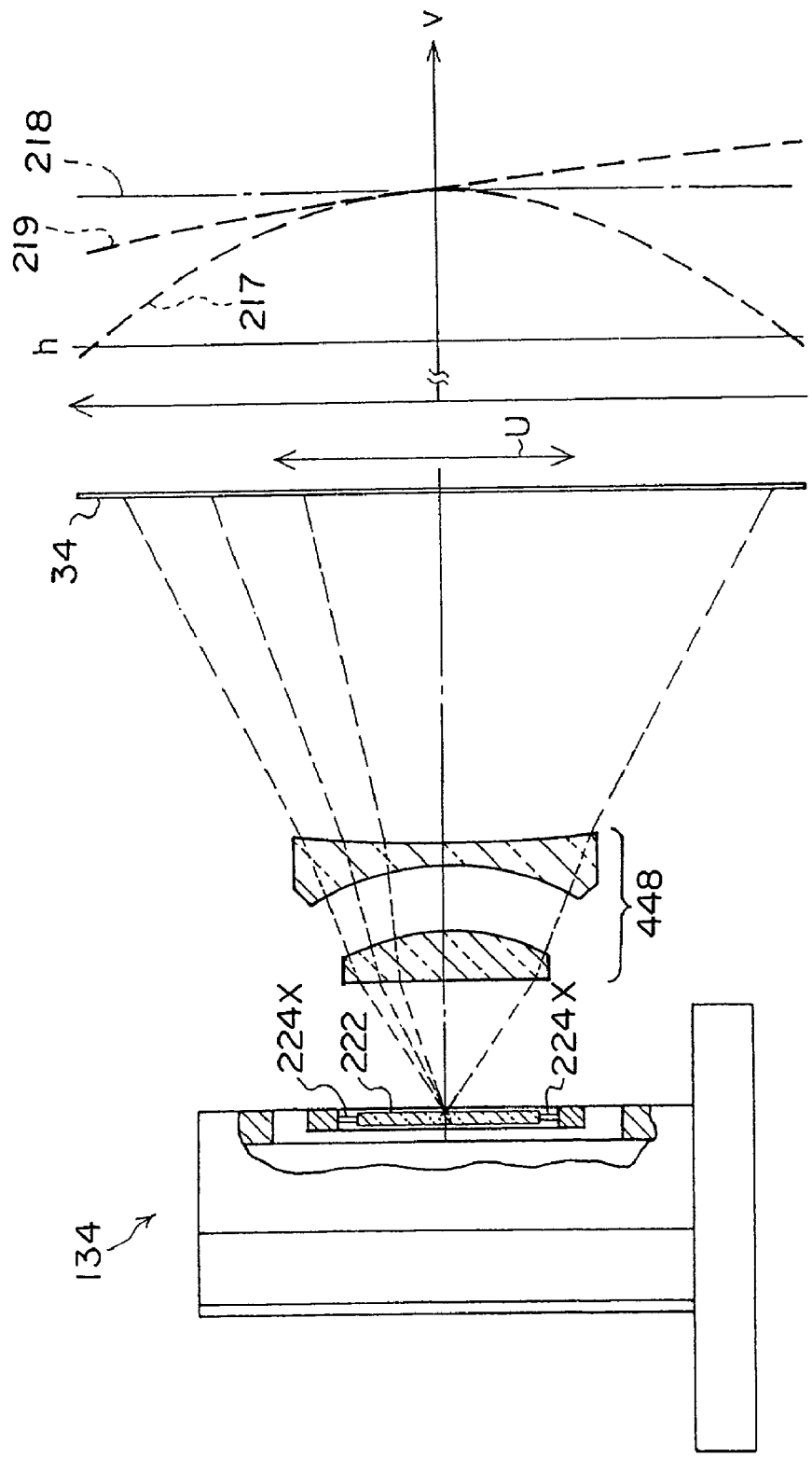
FIG. 8 is a conceptual diagram showing the state in which reflected light is optically corrected by an arcsine lens in the second embodiment of the present invention, in which the travelling speed (v) of spot light illuminated to a recording material is indicated by a horizontal axis and a distance (h) in a main scanning (first scanning) direction from laser light transmitted through the center of the arcsine lens on the recording material is indicated by a vertical axis.

Laser light is made to scan the recording material 34 by using the arcsine lens 448 in the main scanning direction U at the speed close to a constant speed (see the travel speed line 218 in FIG. 8).

If the reflection type scanning optical system including the arcsine lens 448, and the deflecting mirror 222 does not coincide in phase, a difference is made in the linear speed (see the travel speed line 219 in FIG. 8). Therefore, the base body 230 is rotated so that the difference in the scanning speed between at least two arbitrary points on the main scanning line becomes minimum, and the deflecting mirror 222 is rotated and adjusted together with the frame member 228.

[Position Correction of Reflected Light in Sub-scanning Direction]

Figure 9:
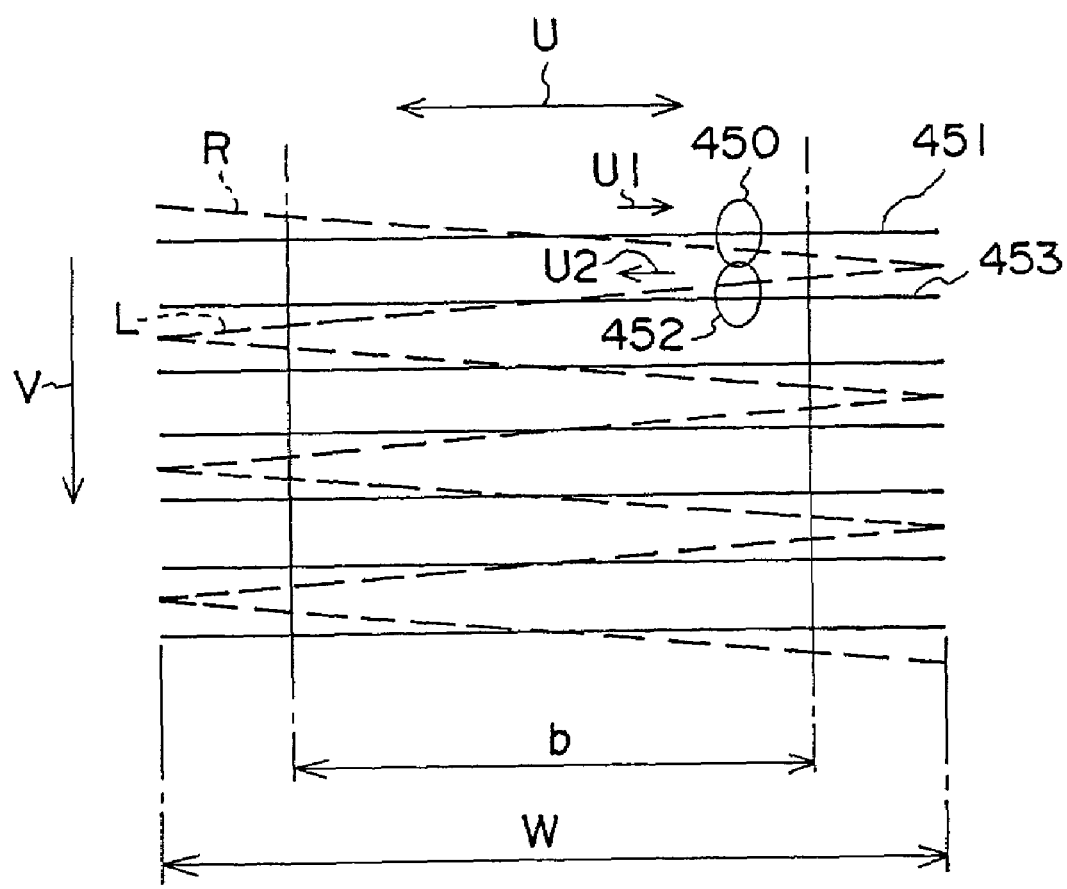
FIG. 9 is a schematic diagram showing main scanning lines generated by the image recording material according to the second embodiment of the present invention.

The image recording apparatus 410 makes the deflecting mirror 222 rotate around the x axis while generating main scanning lines, and moves the position of spot light in the sub-scanning direction V. In this case, as shown in FIG. 9, the size of spot light is set so that a partial region of spot light 450 for generating a main scanning line and a partial region of spot light 452 for generating an adjacent main scanning line are made to overlap with each other in the sub-scanning direction V. As a result, there is no possibility that a desired density cannot be obtained due to a region of the recording material being irradiated with no laser light, or density unevenness caused by a position error of spot light may occur.

Further, when the main scanning lines are generated in the image recording apparatus 410, the position of spot light on the image recording apparatus is adjusted in the sub-scanning direction V to allow correction of baud.

When the aforementioned correction is carried out, reciprocating main scanning lines generated by laser light scanning on the recording material are made parallel to each other. For example, as shown in FIG. 9, a main scanning line 451 generated by forward scanning and a main scanning line 453 generated by backward scanning are made parallel to each other.

Figure 10:
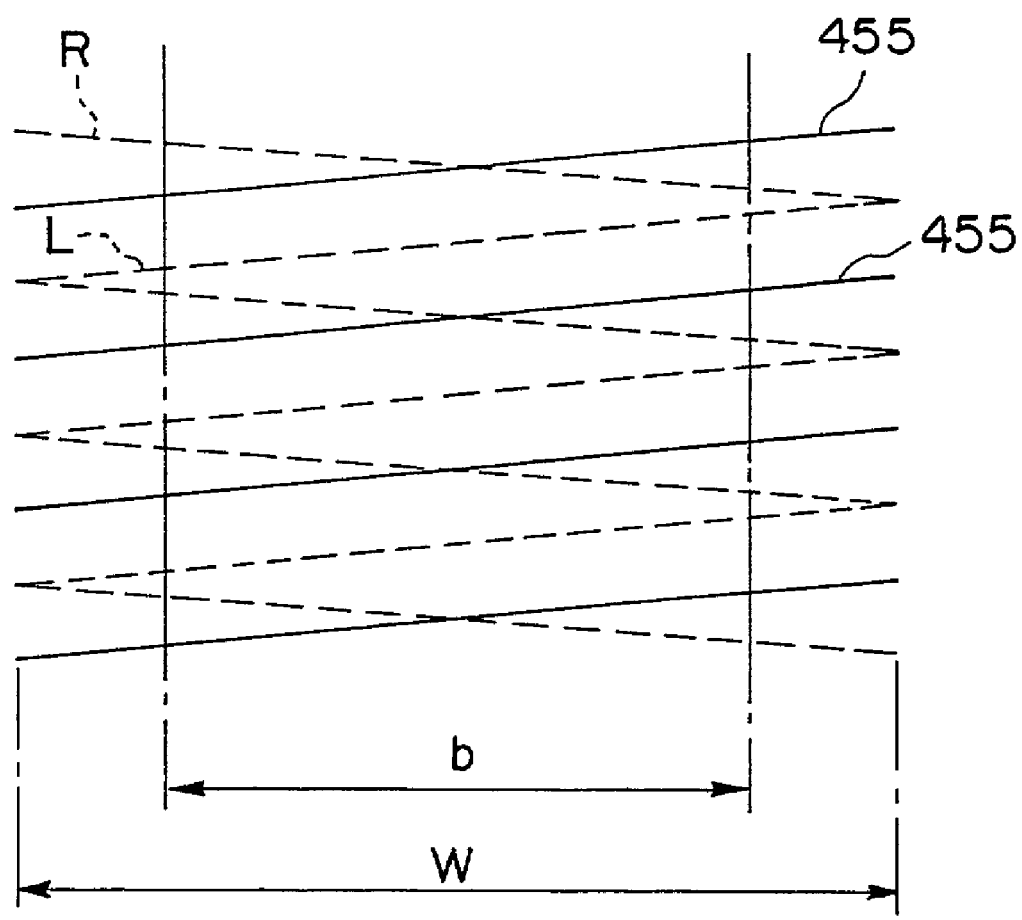
FIG. 10 is a schematic diagram showing main scanning lines generated by the image recording material according to the second embodiment of the present invention.

When no correction is carried out, forward and backward main scanning lines generated by laser light scanning on the recording material are not made parallel to each other. For example, a main scanning line R generated by forward scanning, and a main scanning line L generated by backward scanning are not made parallel to each other (see FIGS. 9 and 10).

So long as the main scanning lines are made parallel to each other, an image of a satisfactory image quality is obtained. Therefore, main scanning lines 455 made not parallel to a recording width B or an amplitude W may be generated (see FIG. 10).

[Other Correction]

The time interval between the time the right-handed end portion of a main scanning line is irradiated with spot light, and the time the right-handed end portion of a subsequent main scanning line is irradiated with spot light, and the time interval between the time the left-handed end portion of a main scanning line is irradiated with spot light, and the time the left-handed end portion of a subsequent main scanning line is irradiated with spot light are equal to each other during one-way scanning, but are different from each other during reciprocating scanning. Further, the time interval between the time the central portion of a main scanning line is irradiated with spot light, and the time the central portion of a subsequent main scanning line is irradiated with spot light becomes an intermediate value or thereabouts between the right-handed and left-handed end portions.

If the time intervals at the right-handed end and at the left-handed end of the main scanning lines differ from each other, density unevenness may be caused by characteristics of the recording material. Particularly, in the case of a color image, density unevenness remarkably occurs.

Although the time intervals at the right-handed end and at the left-handed end of the main scanning lines differ from each other due to reciprocating scanning, the intensity of spot light or the time light is emitted is adjusted by correcting data to be recorded on the recording material, or a look-up table for shading correction in accordance with or synchronously with conveying of the recording material in the sub-scanning direction, thereby making it possible to prevent occurrence of density unevenness in an image to be obtained.

Specifically, as shown in FIG. 9, when scanning light moves in the direction indicated by arrow U1 to generate the main scanning line 451 and scanning light moves in the direction indicated by arrow U2 to generate the main-scanning line 453, the time interval between the time the right-handed end of the main scanning line 451 is irradiated with light and the time the right-handed end of the main scanning line 453 is irradiated with light is shorter than the time interval between the time the left-handed end of the main scanning line 451 is irradiated with light and the time the left-handed end of the subsequent main scanning line 453 is irradiated with light. Further, the time interval between the time the central portion of the main scanning line 451 is irradiated with light and the time the central portion of the main scanning line 453 is irradiated with light becomes a substantially intermediate value between the aforementioned time intervals at the right-handed end and the left-handed end.

As described above, when the time interval between the time a certain position is irradiated with light and the time a position adjacent thereto is irradiated with light varies, density unevenness may be caused by characteristics of the recording material. When a color image is recorded on a photosensitive material, the density unevenness is remarkably caused.

For this reason, the intensity of spot light or the time light is emitted is adjusted by correcting data to be recorded for image recording, or a look-up table, thereby making it possible to prevent occurrence of density unevenness in an image to be obtained.

As described above, according to the present embodiment, an image recording apparatus in which an image of a satisfactory image quality can be formed by reciprocating scanning is realized. Since an image is formed by reciprocating scanning, an exposure duty can be increased and the recording material can be conveyed in the sub-scanning direction at a high speed, thereby resulting in reduction of printing time.

Next, a modified example of the second embodiment of the present invention will be described. Note that the same members as those of the second embodiment will be denoted by the same reference numerals, and a description thereof will be omitted.

Figure 11:
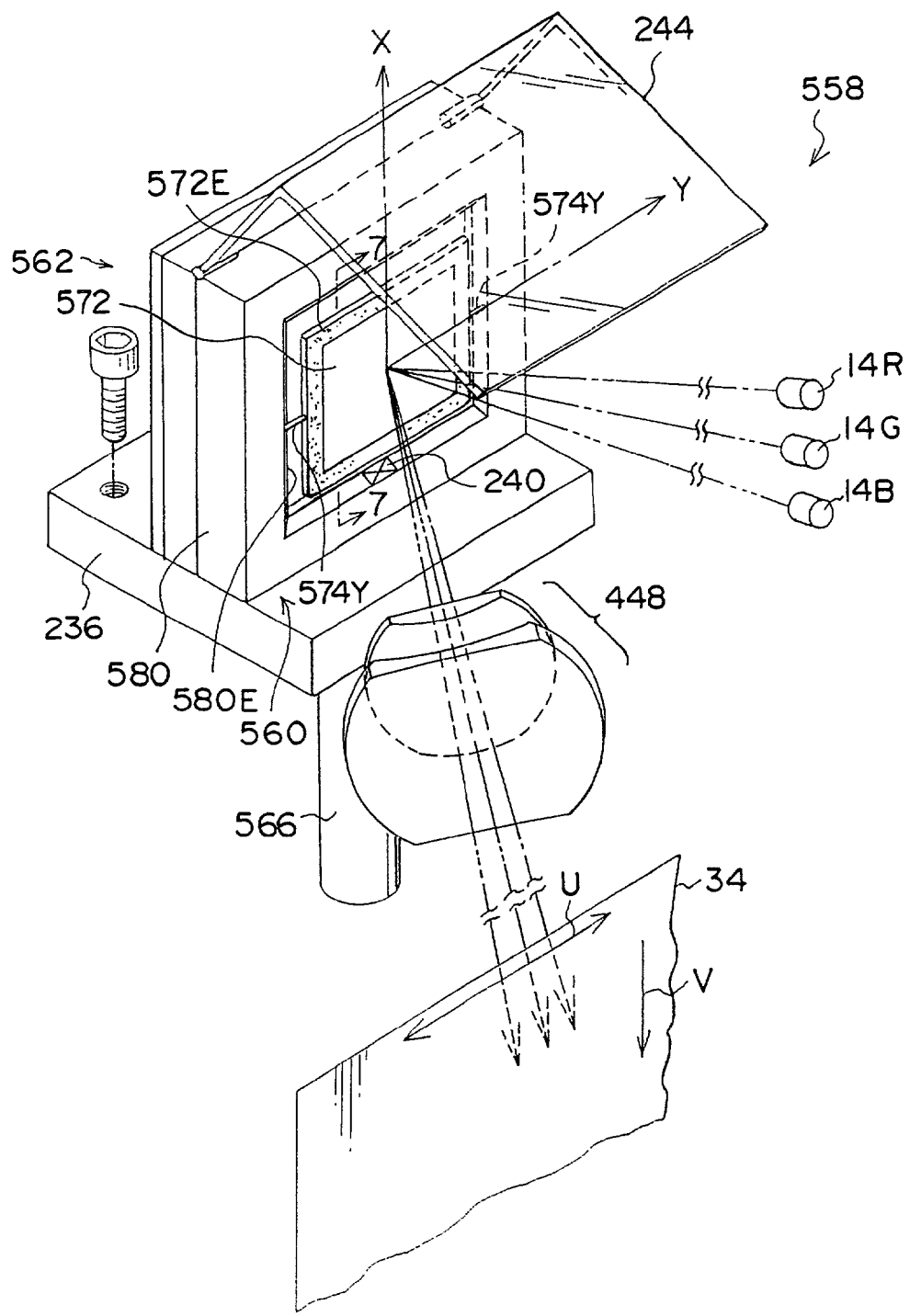
FIG. 11 is a perspective view showing the state in which laser light is caused to scan in a two-dimensional manner in an image recording apparatus according to a modified example of the second embodiment of the present invention.

As shown in FIG. 11, an image recording apparatus 558 according to the present embodiment is provided with a deflector 562 having a micro-scanner 560 having a micro-scanner 560 which can oscillate around one axis, and a rotatable supporting shaft 566 for supporting the mounting table 236. The micro-scanner 560 includes a deflecting mirror 572 rotatably supported by beams 574Y around the y axis. The beams 574Y are supported by a base body 580 which forms the deflector 562.

Accordingly, the frame member 228 (see FIG. 7) is not required by the aforementioned structure. Therefore, the size of the deflector 562 can be made smaller than the deflector 412 in the second embodiment (see FIG. 7). In the same manner as in the second embodiment, an antireflection method is given with the peripheral edge 572E on the reflecting surface of the deflecting mirror 572 and the beams 574Y being colored in black.

The reflected light is moved in the sub-scanning direction V due to oscillation of the deflecting mirror 572 and the reflected light is made to scan in the main scanning direction U due to rotation of the supporting shaft 566.

Figure 12:
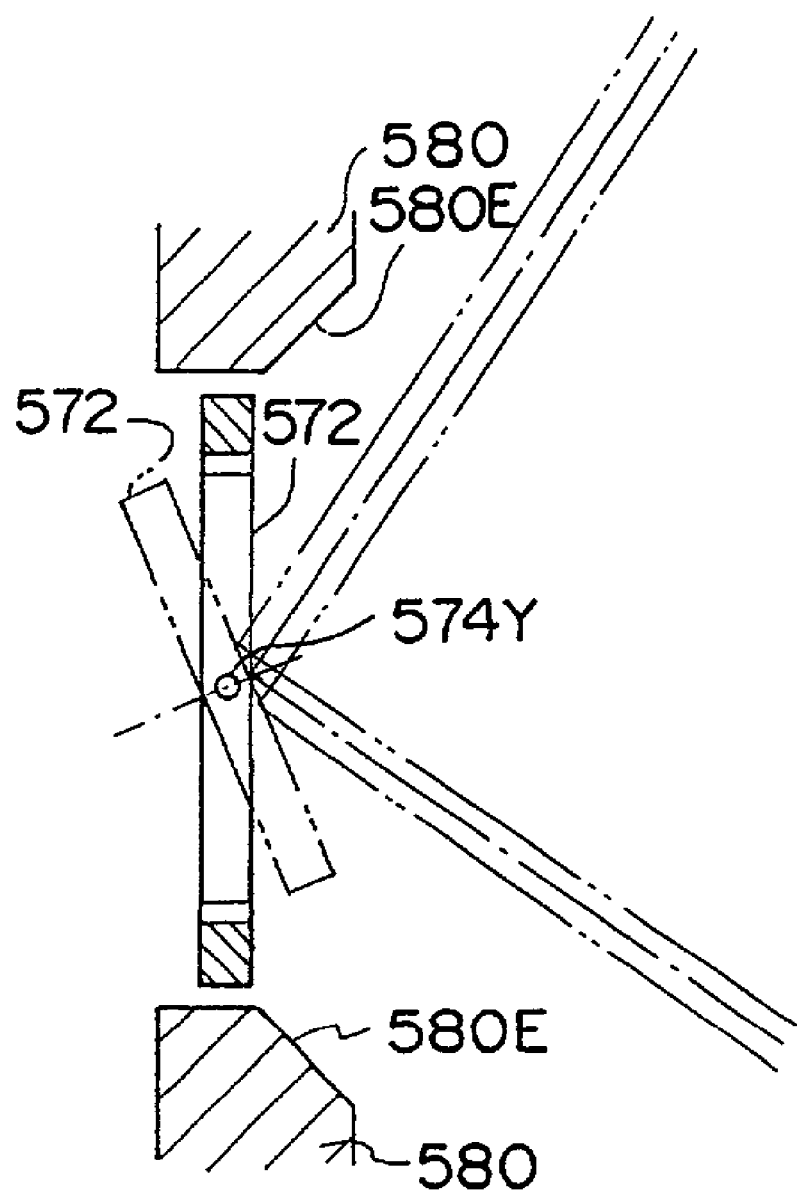
FIG. 12 is a partial cross-sectional side view corresponding to arrows 7—7 in FIG. 11, which shows the state in which laser light is caused to scan in a two-dimensional manner in the image recording apparatus according to the modified example of the second embodiment of the present invention.
Figure 13:
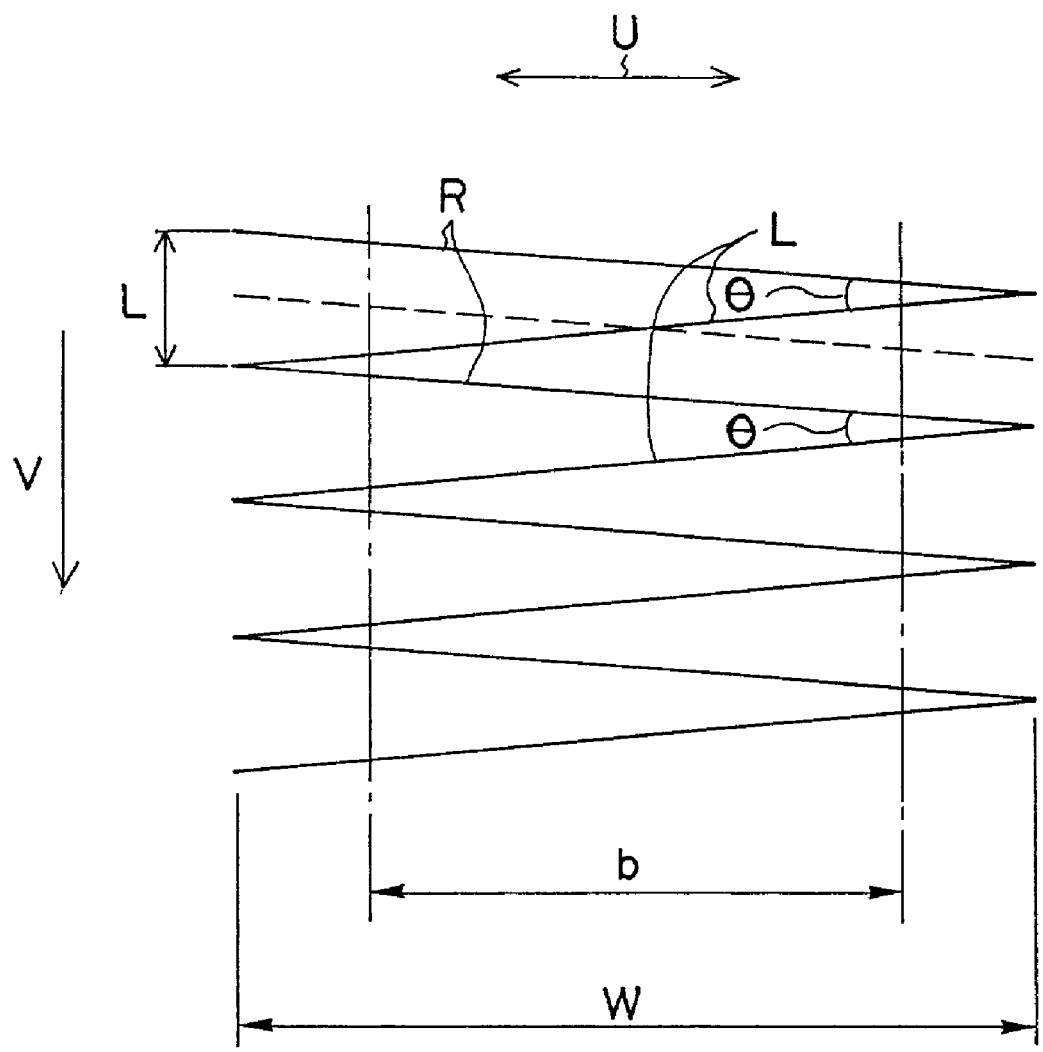
FIG. 13 is a schematic diagram showing main scanning lines generated by a conventional image recording apparatus of a reciprocating scanning type.

As shown in FIG. 12, in order to prevent occurrence of so-called eclipse in reflected light reflected by the deflecting mirror 572, a peripheral edge 580E of the base body 580 at a light reflection side (the side where laser light is reflected) is chamfered.

According to the aforementioned structure, even when an image forming apparatus is used which has a simple structure and a small-size deflector as compared with the second embodiment, an image of a satisfactory image quality can be formed by reciprocating scanning of laser light in a two-dimensional manner.

Figure 14:
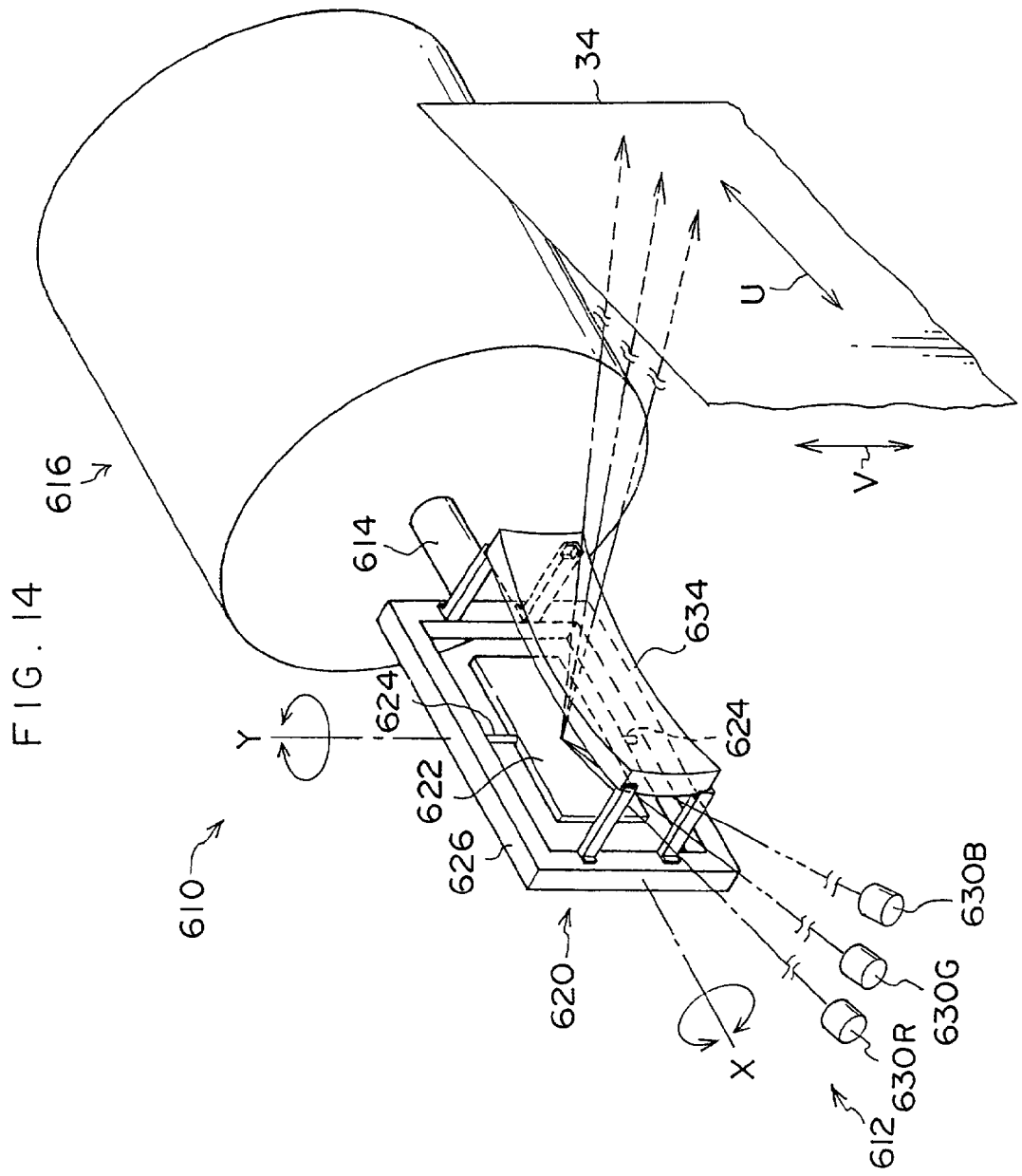
FIG. 14 is a perspective view showing an image forming apparatus according to an embodiment of the present invention.
Figure 15:
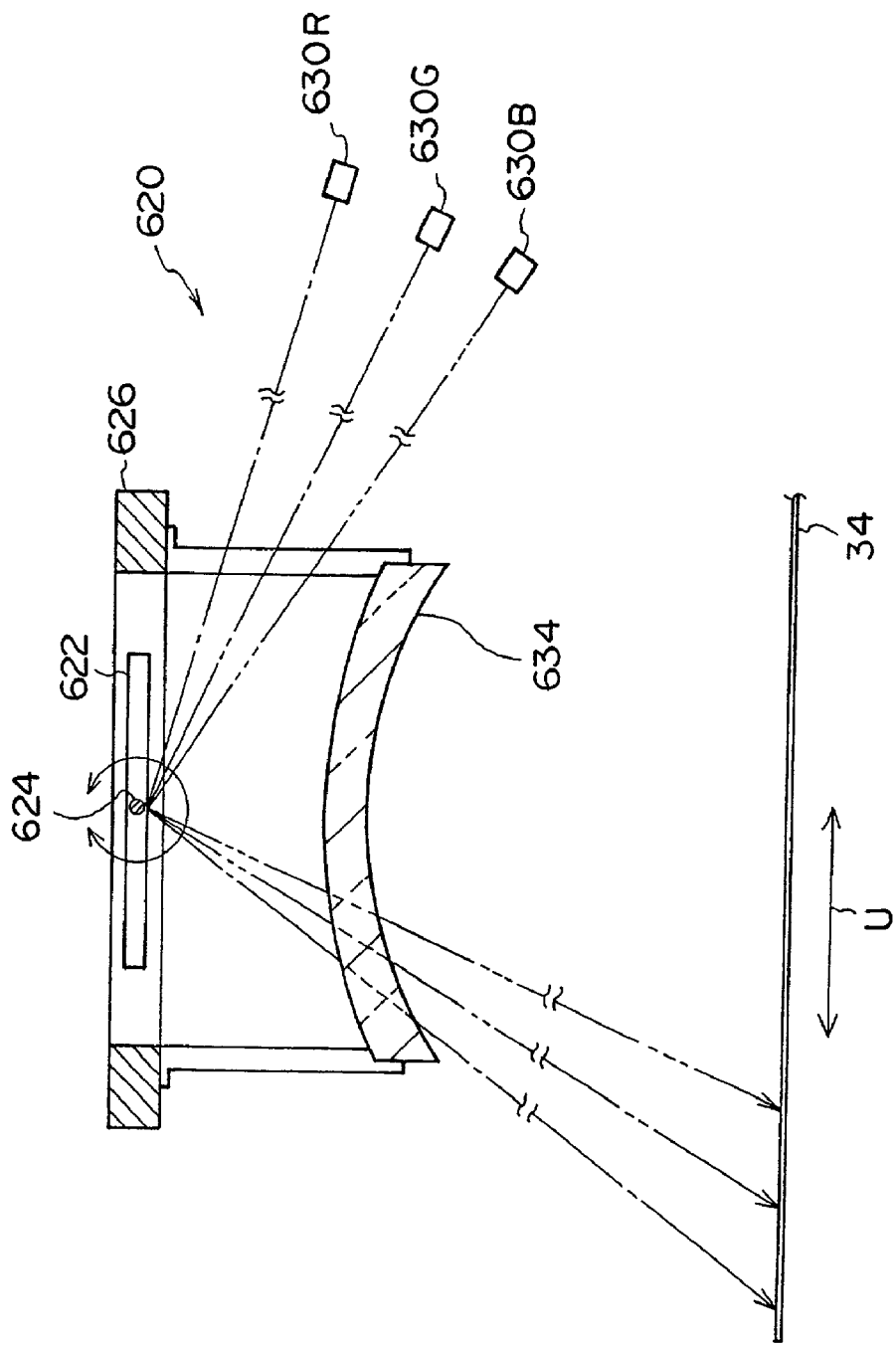
FIG. 15 is a plan view showing the state in which laser light is caused to scan by a deflector according to the embodiment of the present invention.

Further, a deflector 610 shown in FIGS. 14 and 15 can be provided in an image recording apparatus 612. The deflector 610 is structured in such a manner that a one-dimensional micro-scanner 620 is mounted at a rotating shaft 614 of a galvanometer scanner 616. The one-dimensional micro-scanner means a micro-scanner which can oscillate around one axis.

The micro-scanner 620 includes a deflecting mirror 622 comprised of a silicon wafer, two beams 624 for supporting the deflecting mirror 622 at both sides thereof from a direction perpendicular to the rotating shaft 14, and a supporting member 626 for supporting the two beams 624. In the micro-scanner 20, a piezoelectric element may be used as a driving source.

Electric current is made to flow from electric wiring (not shown) provided within the rotating shaft 614 to the peripheral edge of the deflecting mirror 622 via the beams 624 to generate a magnetic field. Due to an interaction between the generated magnetic field and a magnetic field generated by a permanent magnet (not shown) provided around the deflecting mirror 622, the deflecting mirror 622 is caused to rotate around the y axis with the beams 624 serving as an axis of rotation. In this case, generally, pulse current is made to flow corresponding to the resonance frequency of the deflecting mirror 622. As a result, laser light is caused to scan on the recording material 34 in the main scanning direction U. Due to rotation of the rotating shaft 614 around the x axis, laser light is caused to scan on the recording material 34 in the sub-scanning direction V.

The image recording apparatus 612 is provided in such a manner that laser light corresponding to the three primary colors of R, G and B is emitted from three laser devices 630R, 630G and 630B to the deflecting mirror 622 so as to record an image in colors. An ND filter, beam reshaping lens (which are both not shown) or the like may be provided at an emission opening of each laser device. Further, a single laser device may be provided as the light source in place of the three laser devices 630R, 630G and 630B to allow three laser light each having a single wavelength to be diverged and applied to the deflecting mirror 622. Moreover, the laser light used herein may be ultraviolet light or infrared light.

The driving frequency of the rotating shaft 614 is set to be less than or equal to 1/100 of the driving frequency of the rotation with the beams 624 serving as the axis of rotation. As a result, laser light is caused to scan in the main scanning direction U at a high speed, and laser light is caused to scan in the sub-scanning direction at a speed relatively lower than that in the main scanning direction U, which is preferable in recording an image of a satisfactory image quality on the recording material 34.

An arcsine lens 634 is mounted to the supporting member 626 so as to face the deflecting mirror 622.

In the image recording apparatus 612, laser light is made to reach the deflecting mirror 622 without being transmitted through the arcsine lens 634, and reflected by the deflecting mirror 622. The reflected laser light is caused to scan in the main scanning direction in a sinusoidal waveform, and thereafter, the laser light is caused to scan the recording material 34 at a constant linear speed by being transmitted through the arcsine lens 634.

Thus, in the image recording apparatus 612, the arcsine lens 634 serving as an image-forming optical system is mounted integrally with the supporting member 626 of the micro-scanner 620. As a result, the structure of the optical system in the image recording apparatus 612 can be simplified.

The rotating shaft 614 rotates as the rotating shaft of the galvanometer scanner 616. Accordingly, laser light reflected by the deflecting mirror 622 moves in the sub-scanning direction at a constant linear speed by being transmitted through the arcsine lens 634.

In the foregoing, the image recording apparatus used as the image forming apparatus was described as an example. However, other types of image forming apparatus, for example, a display device can be similarly made smaller and formed as a simple structure. Further, so long as an angle detecting function is given to the micro-scanner 620 or to the galvanometer scanner 616, laser light can be made to scan so that main scanning lines are generated at uniform intervals without using the arcsine lens 634.

As described above, in accordance with the present invention, a plurality of light beams of different wavelengths emitted from laser light sources are each reshaped by a reshaping means, the light beams are deflected by rotating a reflecting mirror of the a deflecting means in a predetermined direction, and the deflected light beams are guided to an exposure medium by a reflection type optical system. Therefore, no large size equipment such as a rotating polygon mirror is required, and exposure can be carried out only by reflecting the light beams. As a result, the light beams having different wavelengths can be used in no consideration of chromatic aberration or the like.

The present invention has the aforementioned structure, and can take effects: (1) the position of laser light in the sub-scanning direction during main scanning can be freely adjusted; (2) the interval between adjacent main scanning lines can be set fixedly; (3) no means for correcting baud is separately provided and the apparatus can be made smaller and simplified; (4) no region irradiated with reflected light is formed on the recording material, and therefore, a wide region of density reproduction is formed and density unevenness caused by a position error of spot light is prevented; and (5) occurrence of density unevenness in the main scanning direction of an image to be obtained can be prevented.

What is claimed is:

1. An image forming apparatus comprising:
   laser light sources which emit a plurality of light beams having different wavelengths;
   a reshaping section for reshaping each of the plurality of light beams;
   a deflector provided with a reflecting mirror which reflects incident light beam, the deflector deflecting the light beam by rotating the reflecting mirror around a rotation axis provided substantially on a surface of the reflecting mirror in a predetermined direction;
   a reflection type optical system having at least one reflecting surface which reflects the deflected light beam deflected by the deflector and guiding the light beam reflected by the reflecting surface to an image forming medium; and
   a control section which, based on image data, supplies a control signal for modulating the plurality of light beams to the laser light sources
   wherein the at least one of the reflecting surface of the reflection type optical system is formed so as to have arcsine characteristics as a property of reflecting the incident light beam.

2. An image forming apparatus according to claim 1, wherein the laser light sources are provided so as to emit at least three light beams corresponding to color hues of cyan, magenta and yellow.

3. An image forming apparatus according to claim 1, wherein a rotation of the reflecting mirror in the predetermined direction in the deflector is such that the reflecting mirror is repeatedly rotated alternately in an one direction and an opposite direction.

4. An image forming apparatus according to claim 1, wherein, in the reflection type optical system, an expansion coefficient of at least part of members which constitute the reflecting surfaces is made substantially equal to that of a housing body of the image forming apparatus.

5. An image forming apparatus according to claim 1, wherein modulation systems corresponding to respective laser light sources arc applied to the control section.

6. An image forming apparatus according to claim 1, wherein the reshaping section is structured in such a manner that an optical axis of the light beam and a center optical axis of the reshaping section are made to cross each other.

7. An image forming apparatus having a deflector in which reciprocating scanning of reflected light is carried out in a two-dimensional manner by rotating a mirror surface around two axes, said deflector comprising:
   a micro scanner having a reflecting mirror which is capable of rotating around a first axis and a second axis which are perpendicular to each other, the first axis and the second axis being provided substantially on a surface of the reflecting mirror;

a position correcting section for moving a position in a subscanning direction of the reflected light in the subscanning direction by rotating the reflecting mirror around the second axis in accordance with conveyance, of a recording medium in the subscanning direction while the reflected light is reciprocately scanned on the recording medium in a mainscan direction by oscillating the reflecting mirror around the first axis; and an arcsine lens through which light reflected by the reflecting mirror is transmitted to the recording medium.

8. An image forming apparatus according to claim 7, wherein when the reflecting mirror is rotated around the second axis, correction is carried out so that main scanning lines generated on the recording medium are substantially at uniform intervals.

9. An image forming apparatus according to claim 7, wherein when the reflecting mirror is rotated around the second axis, bow of the main scanning lines on the recording medium is corrected.

10. An image forming apparatus according to claim 7, wherein, on the recording medium, a partial region of a spot light of the reflected light on one main scanning line is made to overlap, in the sub-scanning direction, with a partial region of a spot light of the reflected light on another main scanning line which is adjacent to the one main scanning line.

11. An image forming apparatus according to claim 7, wherein one of an intensity and an emission time of a spot light is adjusted for recording on the recording medium in accordance with the conveyance of the recording medium in the sub-scanning direction.

12. An image forming apparatus comprising:

laser light sources which emit a plurality of light beams having different wavelengths;

a deflector provided with a reflecting mirror which reflects incident light beam, the deflector deflecting the light beam by rotating the reflecting mirror around a rotation axis provided substantially on a surface of the reflecting mirror;

a reflection type optical system having at least one reflecting surface which reflects the deflected light beam deflected by the deflector and guiding the light beam reflected by the reflecting surface to an image forming medium; and a control section which, based on image data, supplies a control signal for modulating the plurality of light beams to the laser light sources, wherein a rotation of the reflecting mirror in the deflector is such that the reflecting mirror is repeatedly rotated alternately in an one direction and an opposite direction within a predetermined angle, wherein the at least one of the reflecting surface of the reflection type optical system is formed so as to have arcsine characteristics as a property of reflecting the incident light beam.

13. An image forming apparatus according to claim 1, wherein the deflector includes a two-dimensional microscanner having a reflecting mirror which is capable of rotating around two axes perpendicular to each other.

14. The apparatus of claim 1, wherein the reflecting section comprises at least one mirror that transmits at least one color light.

15. The apparatus of claim 12, wherein the reflecting section comprises at least one mirror that transmits at least one color light.

16. The apparatus of claim 14, wherein said at least one mirror is a dichoric mirror.

17. The apparatus of claim 15, wherein said at least one mirror is a dichoric mirror.

18. The apparatus of claim 2, wherein, the three light sources are at different ends of the reflection type optical system.

19. The apparatus of claim 12, wherein the light sources comprise three light sources that are positioned at different ends of the reflection type optical system.

20. The apparatus of claim 3, where scanning is performed in the two opposite directions while light is being applied.

21. The apparatus of claim 1, further comprising a recording medium.

22. The apparatus of claim 21, wherein the recording medium is moved in a sub-scan direction.

23. The apparatus of claim 12, further comprising a recording medium.

24. The apparatus of claim 23, wherein the recording medium is moved in a sub-scan direction.

25. The apparatus of claim 21, wherein the recording medium is a printing paper.

26. The apparatus of claim 23, wherein the recording medium is a printing paper.

* * * * *